(12) United States Patent
Nakayama et al.

(10) Patent No.: US 12,195,369 B2
(45) Date of Patent: Jan. 14, 2025

(54) WATER TREATMENT DEVICE

(71) Applicant: Mitsubishi Electric Corporation, Chiyoda-ku (JP)

(72) Inventors: Yoshihiro Nakayama, Chiyoda-ku (JP); Eiji Imamura, Chiyoda-ku (JP); Seiji Noda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 1092 days.

(21) Appl. No.: 17/040,634

(22) PCT Filed: Mar. 5, 2019

(86) PCT No.: PCT/JP2019/008672
§ 371 (c)(1),
(2) Date: Sep. 23, 2020

(87) PCT Pub. No.: WO2019/193901
PCT Pub. Date: Oct. 10, 2019

(65) Prior Publication Data
US 2021/0053849 A1 Feb. 25, 2021

(30) Foreign Application Priority Data
Apr. 5, 2018 (JP) .................................. 2018-072817

(51) Int. Cl.
*C02F 1/469* (2023.01)
*C02F 1/00* (2023.01)
*C02F 101/10* (2006.01)

(52) U.S. Cl.
CPC ............ *C02F 1/4691* (2013.01); *C02F 1/008* (2013.01); *C02F 2101/10* (2013.01);
(Continued)

(58) Field of Classification Search
CPC .................................................... C02F 1/4691
See application file for complete search history.

(56) References Cited

U.S. PATENT DOCUMENTS

2002/0167782 A1* 11/2002 Andelman .............. C02F 1/008
361/302
2014/0353167 A1 12/2014 Cho

FOREIGN PATENT DOCUMENTS

EP      1 348 670 A1   10/2003
JP     2001-58180 A   3/2001
(Continued)

OTHER PUBLICATIONS

English Translation of JP 2001/058180 (Year: 2001).*
(Continued)

*Primary Examiner* — Salil Jain
(74) *Attorney, Agent, or Firm* — XSENSUS LLP

(57) ABSTRACT

This water treatment device includes: electrode units for performing adsorption/desorption of the impurity; a treatment tank having the electrode units disposed in an inside of the treatment tank; an upstream part for guiding the water into the inside; a downstream part for guiding the water so as to be discharged, the water having been subjected to the adsorption/desorption performed by the electrode units; a circulation pipeline, the circulation pipeline being for guiding water having been guided by the downstream part, to the upstream part; and a switching unit for switching between, on the basis of at least one of a water quality of the water having been guided to the downstream part or an electric state of the treatment tank, guiding the water having been guided by the downstream part, so as to be discharged, and guiding the water to the circulation pipeline.

14 Claims, 9 Drawing Sheets

(52) U.S. Cl.
CPC .......... *C02F 2201/005* (2013.01); *C02F 2201/4613* (2013.01); *C02F 2201/46135* (2013.01); *C02F 2201/4614* (2013.01); *C02F 2209/001* (2013.01); *C02F 2209/003* (2013.01); *C02F 2301/046* (2013.01); *C02F 2303/16* (2013.01)

(56) References Cited

FOREIGN PATENT DOCUMENTS

| JP | 2002-273432 A | 9/2022 | |
|---|---|---|---|
| WO | WO-2013017412 A1 * | 2/2013 | .............. C02F 1/008 |

OTHER PUBLICATIONS

Extended European Search Report issued Apr. 14, 2021 in European Patent Application No. 19782182.0, 29 pages.
European Office Action issued Dec. 21, 2022 in corresponding European Patent Application No. 19782182.0, 5 pages.
International Search Report issued Jun. 4, 2019 in PCT/JP2019/008672 filed Mar. 5, 2019, 2 pages.
Japanese Office Action issued Aug. 6, 2019 in Japanese Patent Application No. 2019-532164 (with English language translation), 7 pages.

* cited by examiner

WATER TREATMENT DEVICE

TECHNICAL FIELD

The present invention relates to a water treatment device and a water treatment method for performing a purification treatment on water by removing an ionic substance from an aqueous solution including the ionic substance.

BACKGROUND ART

A capacitive deionization (CDI) technology using an electrical double layer capacitor technology is a method for removing an ionic substance from an aqueous solution to be treated, by using a Coulomb force. As such a conventional technology, the following liquid treatment method is known, for example. That is, while a liquid containing an ionic substance is passed through a liquid-passing-type electrical double layer condenser that has an electric insulating sheet, an activated carbon layer, collector electrodes, and a holder plate, application of DC constant voltage to the collector electrodes, and short-circuiting or reverse connection between the collector electrodes are alternately repeated.

As the CDI technology, for example, Patent Document 1 proposes a liquid-passing-type condenser device that applies DC voltage to a pair of electrodes, to remove an ion component in a treatment target liquid being passed. In this liquid-passing-type condenser device, in a recovery step of the removed ion component, the liquid having flowed out of the liquid-passing-type condenser device is caused to circulate for a predetermined time, by returning the liquid to the flow-in side of the liquid-passing-type condenser device.

CITATION LIST

Patent Document

Patent Document 1: Japanese Laid-Open Patent Publication No. 2001-58180

SUMMARY OF THE INVENTION

Problems to be Solved by the Invention

In the CDI technology as in Patent Document 1, the ionic substance in the aqueous solution is caused to be adsorbed by the electrodes under application of the voltage, thereby removing the ionic substance, and the adsorbed ionic substance is released from the electrodes, thereby allowing adsorption of a new ionic substance. Thus, with respect to the CDI technology, the efficiency of releasing the adsorbed ionic substance from the electrodes is desired to be further improved, in consideration of the removing performance for the ionic substance.

The present invention has been made in consideration of the above circumstances. An object of the present invention is to provide a water treatment device and a water treatment method that can improve the efficiency of releasing an ionic substance having been adsorbed by use of a CDI technology. In the following, treatment target water represents water before a purification treatment in which an impurity in water is adsorbed by electrode units, treated water represents water after the purification treatment in which the impurity in water is adsorbed by the electrode units, and washing water represents water to be used during washing in which the impurity adsorbed by the electrode units is released from the electrode units. The treatment target water, the treated water, and the washing water will be collectively referred to as water.

Solution to the Problems

A water treatment device according to the present invention is a water treatment device for removing an impurity in water. The water treatment device includes:
  electrode units for performing adsorption/desorption of the impurity;
  a treatment tank having the electrode units disposed in an inside of the treatment tank;
  an upstream part connected to the treatment tank and for guiding the water into the inside;
  a downstream part connected to the treatment tank and for guiding the water in the inside so as to be discharged, the water having been subjected to the adsorption/desorption performed by the electrode units;
  a circulation pipeline connected to the upstream part and the downstream part, the circulation pipeline being for guiding water having been guided by the downstream part, to the upstream part; and
  a switching unit for switching between, on the basis of at least one of a water quality of the water having been guided to the downstream part or an electric state of the treatment tank, guiding the water having been guided by the downstream part, so as to be discharged, and guiding the water to the circulation pipeline.

A water treatment method according to the present invention is a water treatment method to be performed by using a water treatment device.

The water treatment device includes
  electrode units for performing adsorption/desorption of an impurity,
  a treatment tank having the electrode units disposed in an inside of the treatment tank,
  an upstream part connected to the treatment tank and for guiding water to the inside,
  a downstream part connected to the treatment tank and for guiding the water in the inside so as to be discharged, the water having been subjected to the adsorption/desorption performed by the electrode units,
  a circulation pipeline connected to the upstream part and the downstream part, the circulation pipeline being for guiding water having been guided by the downstream part, to the upstream part, and
  a switching unit for switching between, on the basis of at least one of a water quality of the water having been guided to the downstream part or an electric state of the treatment tank, guiding the water having been guided by the downstream part, so as to be discharged, and guiding the water to the circulation pipeline.

The water treatment method includes:
  alternately repeating a purification treatment step and a washing step, the purification treatment step being a step of performing a purification treatment on the water by performing application of electricity to the electrode units to cause an ionic substance contained in the water in the treatment tank to be adsorbed by the electrode units, the washing step being a step of washing the electrode units by performing at least one of stop of the application of the electricity to the electrode units, short-circuiting, or application of electricity in a reverse direction, to release the ionic substance from the electrode units; and performing switching from the washing step to the purification treatment step, on the basis of at least one of a water quality of the water having been guided to the downstream part or an electric state of the treatment tank.

Effect of the Invention

According to the water treatment device and the water treatment method of the present invention, the efficiency of releasing an ionic substance having been adsorbed by use of a CDI technology can be improved.

DESCRIPTION OF EMBODIMENTS

Figure 1:
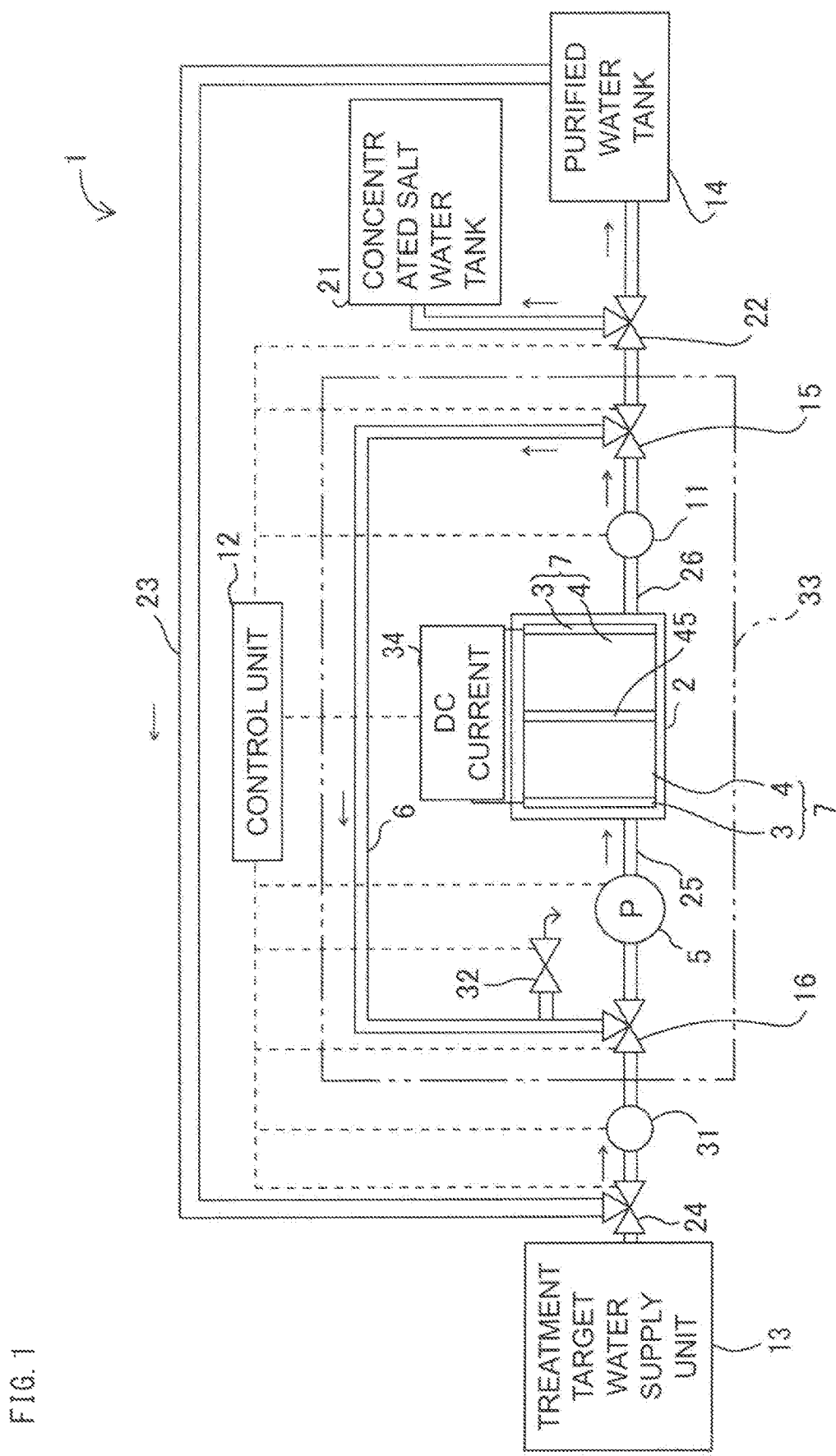
FIG. 1 shows a configuration of a water treatment device according to embodiment 1 of the present invention.

Hereinafter, several embodiments of the present invention will be described with reference to the drawings. In the following description, parts that correspond to matters having been already described in any embodiment preceding each embodiment are denoted by the same reference characters, and the same description thereof may be omitted. In the case where only a part of the configuration is described, the other parts of the configuration are the same as that already described. It is noted that the embodiments shown below are merely examples and the present invention is not limited to these embodiments.

Embodiment 1

FIG. 1 shows a configuration of a water treatment device 1 according to embodiment 1 of the present invention. As shown in FIG. 1, the water treatment device 1 has: a treatment tank 2; electrode units 7; a pump 5 as a fluid transport unit; an examination unit 11 as a water quality examination unit; and a control unit 12 as a water quality base control unit. The treatment tank 2 stores water. The electrode units 7 are disposed inside the treatment tank 2, and adsorb, in the treatment tank 2, an ionic substance in water through application of DC voltage or DC current. Accordingly, the electrode units 7 perform a purification treatment on the water in the treatment tank 2. Hereinafter, in the present embodiment, an example case where DC voltage is applied is described. The electrode units 7 release, into water, the ionic substance adsorbed by the electrode units 7, through cancellation of application of the DC voltage in the purification treatment, i.e., through any of stop of the DC voltage, short-circuiting, and reverse connection. Accordingly, the electrode units 7 are subjected to a washing treatment in the treatment tank 2.

The electrode units 7 have a pair of collector electrodes 3, and a pair of porous electrodes 4. By DC voltage being applied to the pair of collector electrodes 3, DC voltage is applied to the porous electrodes 4. The pair of porous electrodes 4 are formed by particulate activated carbon electrically connected to the collector electrodes 3, and each adsorb an ionic substance contained in the water in the treatment tank 2. In the washing treatment, the ionic substance is released from each porous electrode 4 into water. The pair of porous electrodes 4 are disposed in the treatment tank 2 in a state where the pair of porous electrodes 4 are separated by a separator 45 so that short-circuit between the pair of porous electrodes 4 is prevented.

The pump 5 causes water to move along a route determined in advance, on at least one of the upstream side or the downstream side of the treatment tank 2 in the route. FIG. 1 shows a case where the pump 5 is provided on the upstream side of the treatment tank 2. The examination unit 11 examines the water quality on the downstream side of the treatment tank 2 and the pump 5. The control unit 12 controls the DC voltage between the collector electrodes 3, thereby switching between adsorption of the ionic substance by each porous electrode 4 and release of the ionic substance from the porous electrode 4. Accordingly, the control unit 12 performs switching between the purification treatment of water in the treatment tank 2 and the washing treatment of the porous electrodes 4.

The control unit 12 determines switching from the washing treatment of the porous electrodes 4 to the purification treatment of the water in the treatment tank 2, on the basis of an examination result by the examination unit 11. A PLC (Programmable Logic Controller), a sequencer, a numerical control device, or the like that causes the device to operate in accordance with a designated condition can be used as the control unit 12. In addition, the control unit 12 includes a storage unit that stores examination results by the examination unit 11, examination results by an upstream-side examination unit 31 described later, and initially inputted data.

The water treatment device 1 according to the present embodiment is a device that performs a purification treatment on water by removing an ionic substance from an aqueous solution that contains the ionic substance. Hereinafter, pure water and aqueous solutions are collectively referred to as "water". In particular, water having been subjected to a purification treatment will be referred to "treated water". All the matters that are removed by the porous electrodes 4 will be referred to as "impurity". For example, the water treatment device 1 may be used in a treatment of removing an ionic substance in a purification plant, or may be used as a water purifier that further purifies tap water. The water treatment device 1 may be used in desalination of sea water, or may be used in purification of industrial waste water. The water treatment device 1 can also be attached to an electric appliance, so as to be used in suppression and the like of rust and scale generated at a pipe, a metal portion, or the like in the electric appliance. In general, the water treatment device 1 can be used in a situation where ionic substances need to be removed.

The size of the water treatment device 1 is set in accordance with a usage, i.e., varying from a size for which each tank is as large as a pond, to a size that allows the water treatment device 1 to be incorporated into a home electric appliance, for example. The water treatment device 1 according to the present embodiment is installed in a purification plant and is used as a desalination device. While the purification treatment of water and the washing treatment of the porous electrodes 4 are each performed, the water in the treatment tank 2 is always flowing, excluding a case where stored water is to be discharged. Application of DC voltage to the collector electrodes 3 and control thereof are also performed while the water in the treatment tank 2 is flowing.

The water treatment device 1 further has a circulation pipeline 6, a treatment target water supply unit 13, a purified water tank 14, a downstream-side switching valve 15, and an upstream-side switching valve 16 (in the claims, the downstream-side switching valve 15 and the upstream-side switching valve 16 are collectively referred to as a "switching unit"). The circulation pipeline 6 connects the downstream side of the treatment tank 2, the pump 5, and the examination unit 11, and the upstream side of the treatment tank 2 and the pump 5. The circulation pipeline 6 is connected to the downstream-side switching valve 15 on the downstream side of the treatment tank 2, the pump 5, and the examination unit 11, and is connected to the upstream-side switching valve 16 on the upstream side of the treatment tank 2 and the pump 5. The treatment target water supply unit 13 supplies, to the treatment tank 2, treatment target water to be subjected to the purification treatment, from the upstream side of the treatment tank 2, the pump 5, and the upstream-side switching valve 16.

The purified water tank 14 stores at least a part of the treated water obtained through the purification treatment, on the downstream side of the treatment tank 2, the pump 5, and the downstream-side switching valve 15. In the present embodiment, the treatment target water supply unit 13 is located on the most upstream side in the water treatment device 1, and the purified water tank 14 is located on the most downstream side, together with a concentrated salt water tank 21 described later. In the present embodiment, a pipeline 25 on the upstream side of the treatment tank 2, the treatment tank 2, and a pipeline 26 on the downstream side of the treatment tank 2, excluding the circulation pipeline 6, form the route determined in advance. The pipeline 25 on the upstream side of the treatment tank 2 is an upstream part, and the pipeline 26 on the downstream side of the treatment tank 2 is a downstream part. The purified water tank 14 is a treated water storage tank.

The downstream-side switching valve 15 is controlled by the control unit 12 on the basis of an examination result by the examination unit. 11, and is provided so as to be able to switch the flow path from the treatment tank 2 between a flow to the purified water tank 14 and a flow to the circulation pipeline 6, on the downstream side of the treatment tank 2 and the pump 5. The upstream-side switching valve 16 is controlled by the control unit 12 on the basis of an examination result by the examination unit 11, and is provided so as to be able to switch the flow path toward the treatment tank 2 between the flow from the treatment target water supply unit 13 and the flow from the circulation pipeline 6, on the upstream side of the treatment tank 2 and the pump 5. The control unit 12 may perform the determination not only on the basis of an examination result by the examination unit 11, but also on the basis of an examination result by the upstream-side examination unit 31 described later, and may perform the determination on the basis of examination results by both the examination unit 11 and the upstream-side examination unit 31.

In the present embodiment, the examination unit 11 is provided on the downstream side of the treatment tank 2 and on the upstream side of the downstream-side switching valve 15. In addition, the concentrated salt water tank 21 is provided on the downstream side of the treatment tank 2 and the downstream-side switching valve 15. The concentrated salt water tank 21 stores water drained from the downstream side of the treatment tank 2 in the washing treatment of the porous electrodes 4. Therefore, water having a higher concentration of the ionic substance than that of the treatment target water is stored in the concentrated salt water tank 21. The concentrated salt water tank 21 may store a part of treated water obtained through the purification treatment. On the further downstream side of the downstream-side switching valve 15 and on the upstream side of the purified water tank 14 and the concentrated salt water tank 21 in the route, a flow path switching valve 22 is provided so as to switch between the flow path from the pipeline 26 on the downstream side of the treatment tank 2 toward the purified water tank 14, and the flow path from the pipeline 26 on the downstream side of the treatment tank 2 toward the concentrated salt water tank 21. A drainage part denotes a portion on the downstream side of the connection point of the downstream part and the circulation pipeline 6. That is, the concentrated salt water tank 21 is included in the drainage part.

In addition, the water treatment device 1 has a return pipeline 23. The return pipeline 23 guides the treated water in the purified water tank 14 to at least one of the pipeline on the upstream side of the treatment tank 2 and the pump 5, or the circulation pipeline 6. FIG. 1 shows a case where the treated water in the purified water tank 14 is guided to the upstream side of the upstream-side examination unit 31 described later. A return switching valve 24 is provided at a connection portion of the return pipeline 23 and the pipeline 25 on the upstream side of the treatment tank 2. The return switching valve 24 is controlled by the control unit 12, and switches the flow path toward the treatment tank 2 between the flow from the treatment target water supply unit 13 and the flow from the return pipeline 23. In a case where the treated water stored in the purified water tank 14 is not used in the washing treatment of the porous electrodes 4, the return pipeline 23 and the return switching valve 24 may not necessarily be provided. The return pipeline 23 is a treated water supply unit.

The water treatment device 1 further has the upstream-side examination unit 31, and the upstream-side examination unit 31 examines the water quality on the upstream side of the treatment tank 2. In the present embodiment, the upstream-side examination unit 31 is provided on the upstream side of the upstream-side switching valve 16. The control unit 12 determines switching the washing treatment of the porous electrodes 4 in the treatment tank 2 to the purification treatment of water, on the basis of one or both of an examination result by the examination unit 11 and an examination result by the upstream-side examination unit 31. The water treatment device 1 has a drain valve 32. The drain valve 32 is controlled by the control unit 12, and allows discharge of water in the circulation pipeline 6 by being opened, at a position in the circulation pipeline 6. When it is difficult to drain the water in the circulation pipeline 6 merely by opening the drain valve 32, an air valve that allows air to flow from outside into the circulation pipeline 6 may be provided.

The drain valve 32 is disposed in the vicinity of the upstream-side switching valve 16. Accordingly, when water is to be sent from the downstream-side switching valve 15 into the circulation pipeline 6, it is easy to perform work of discharging, from the drain valve 32, water already present in the circulation pipeline 6. As shown in FIG. 1, the pump 5, the treatment tank 2, the examination unit 11, the downstream-side switching valve 15, the circulation pipeline 6, the drain valve 32, and the upstream-side switching valve 16 form a circulation unit 33 which forms a water circulation path. The treatment target water supply unit 13, the upstream-side examination unit 31, the upstream-side switching valve 16, the pump 5, the treatment tank 2, the examination unit 11, the downstream-side switching valve 15, the flow path switching valve 22, and a pipeline that forms the flow path connecting these, excluding the circulation pipeline 6, form the route.

The examination unit 11 and the upstream-side examination unit 31 examine water quality information necessary for control by the control unit 12. The examination unit 11 and the upstream-side examination unit 31 can measure any of electric conductivity, electric resistance, ion concentration, and hardness of a liquid, and outputs the measurement result as a signal. In the present embodiment, the examination unit 11 and the upstream-side examination unit 31 measure the electric conductivity. The higher the concentration of the ionic substance in water, the higher the electric conductivity is.

Figure 2:
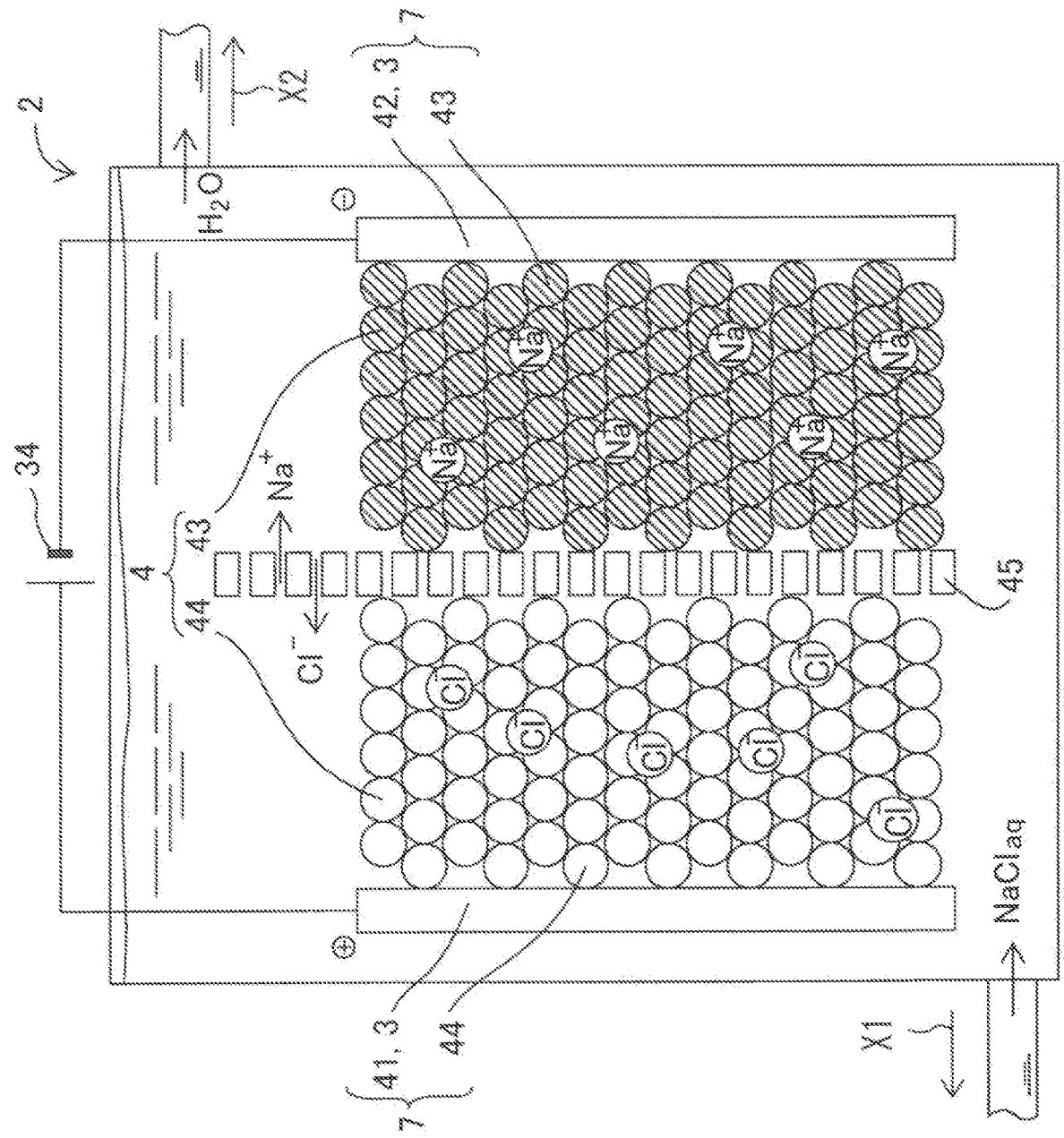
FIG. 2 shows a configuration of a treatment tank according to embodiment 1 of the present invention.

FIG. 2 shows a structure of the inside of the treatment tank 2 in embodiment 1 of the present invention. FIG. 2 shows a state where the purification treatment of water is being performed. FIG. 2 shows an example of removal of sodium ions ($Na^+$) and chloride ions ($Cl^-$). A DC power supply 34 controlled by the control unit 12 is connected to the pair of collector electrodes 3, and DC voltage is applied thereto. A measurement instrument of a current value and a measurement instrument of a voltage value are attached in the vicinity of the DC power supply 34, and the current value and the voltage value between the collector electrodes 3 are measured by the respective measurement instruments. For example, a good conductor having a high electric conductivity, such as a graphite sheet, a graphite plate, GRAFOIL (registered trademark), a titanium plate, a stainless plate, and a copper plate, is used for the collector electrodes 3.

The porous electrodes 4 are electrically connected to the collector electrodes 3, respectively, in the treatment tank 2. By DC voltage being applied between the collector electrodes 3, DC voltage is applied to the porous electrodes 4, whereby the porous electrodes 4 are positively or negatively charged. Water that flows from an upstream direction X1 along the route into the treatment tank 2 contains sodium chloride. A positive electrode 41 and a negative electrode 42 of the collector electrodes 3 may be arranged on the upstream direction X1 side and a downstream direction X2 side, respectively, or vice versa. FIG. 2 shows a case where the positive electrode 41 is arranged on the upstream side. The positive electrode 41 has a higher electric potential than the negative electrode 42, and is an anode to which anions gather. The negative electrode 42 has a lower electric potential than the positive electrode 41, and is a cathode to which cations gather.

The porous electrodes 4 are disposed between the collector electrodes 3. Specifically, the porous electrodes 4 are composed of a negative-electrode-side porous electrode 43 and a positive-electrode-side porous electrode 44. Each of the positive-electrode-side porous electrode 44 and the negative-electrode-side porous electrode 43 is formed of particulate activated carbon. The particulate activated carbon may be any particulate activated carbon capable of establishing electrical connection with the collector electrode 3, and may have any particle size. For example, the particulate activated carbon may be in a granular form or a powdery form. The activated carbon forming each porous electrode 4 has a porous form. Thus, when a spherical body having the same particle size as that of a particle of the activated carbon is assumed, the surface area of the activated carbon is greater than the area of the outer surface of the assumed spherical body.

The positive-electrode-side porous electrode 44 and the negative-electrode-side porous electrode 43 are isolated from each other by the separator 45 having an insulation property. The positive-electrode-side porous electrode 44 is disposed so as to be electrically connected to the positive electrode 41, and is packed between the positive electrode 41 and the separator 45. The negative-electrode-side porous electrode 43 is disposed so as to be electrically connected to the negative electrode 42, and is packed between the negative electrode 42 and the separator 45. For the separator 45, for example, a material that allows easy passage of a liquid and that has an electric insulation property, such as a filter paper, a porous film, a nonwoven fabric, and a foamed material, is used.

Since the positive-electrode-side porous electrode 44 is electrically connected to the positive electrode 41, the positive-electrode-side porous electrode 44 has a higher electric potential than the negative electrode 42, and is positively charged. Therefore, anions, specifically, chloride ions ($Cl^-$), in the water in the treatment tank 2 are adsorbed by the positive-electrode-side porous electrode 44. Accordingly, an electrical double layer is formed on the surface of the solid forming the positive-electrode-side porous electrode 44. Since the negative-electrode-side porous electrode 43 is electrically connected to the negative electrode 42, the negative-electrode-side porous electrode 43 has a lower electric potential than the positive electrode 41, and is negatively charged. Thus, cations, specifically, sodium ions ($Na^+$), in the water in the treatment tank 2 are adsorbed by the negative-electrode-side porous electrode 43. Accordingly, an electrical double layer is formed on the surface of the solid forming the negative-electrode-side porous electrode 43.

The chloride ions and sodium ions adsorbed by the porous electrodes 4 in the purification treatment of water are held in a state of being adsorbed by the positive-electrode-side porous electrode 44 and the negative-electrode-side porous electrode 43, respectively, while DC voltage is being applied. When another cation is contained in the water, the cation is adsorbed by the negative-electrode-side porous electrode 43, similar to the sodium ions. When another anion is contained in the water, the anion is adsorbed by the positive-electrode-side porous electrode 44, similar to the chloride ions.

The DC voltage that is applied between the pair of collector electrodes 3 is set to be less than the voltage at which electrolysis of water occurs. As for the theoretical value of the electric potential at which electrolysis of water occurs, i.e., the theoretical value of the oxidation potential of water, is about 1.23 V with reference to a standard hydrogen electrode. However, when the ground potential is used as a reference in the water treatment device 1, electrolysis of water does not occur until the electric potential between the collector electrodes 3 becomes about 2 V. A plurality of factors for this are conceivable, such as internal resistance and overvoltage in the treatment tank 2. However, practically, any voltage between the collector electrodes 3 that does not cause electrolysis of water may be used. In a case where a plurality of the treatment tanks 2 are connected in series, a high DC voltage may be applied as a whole, as long as the DC voltage to be applied between the collector electrodes 3 is equal to or less than 2 V.

Figure 3:
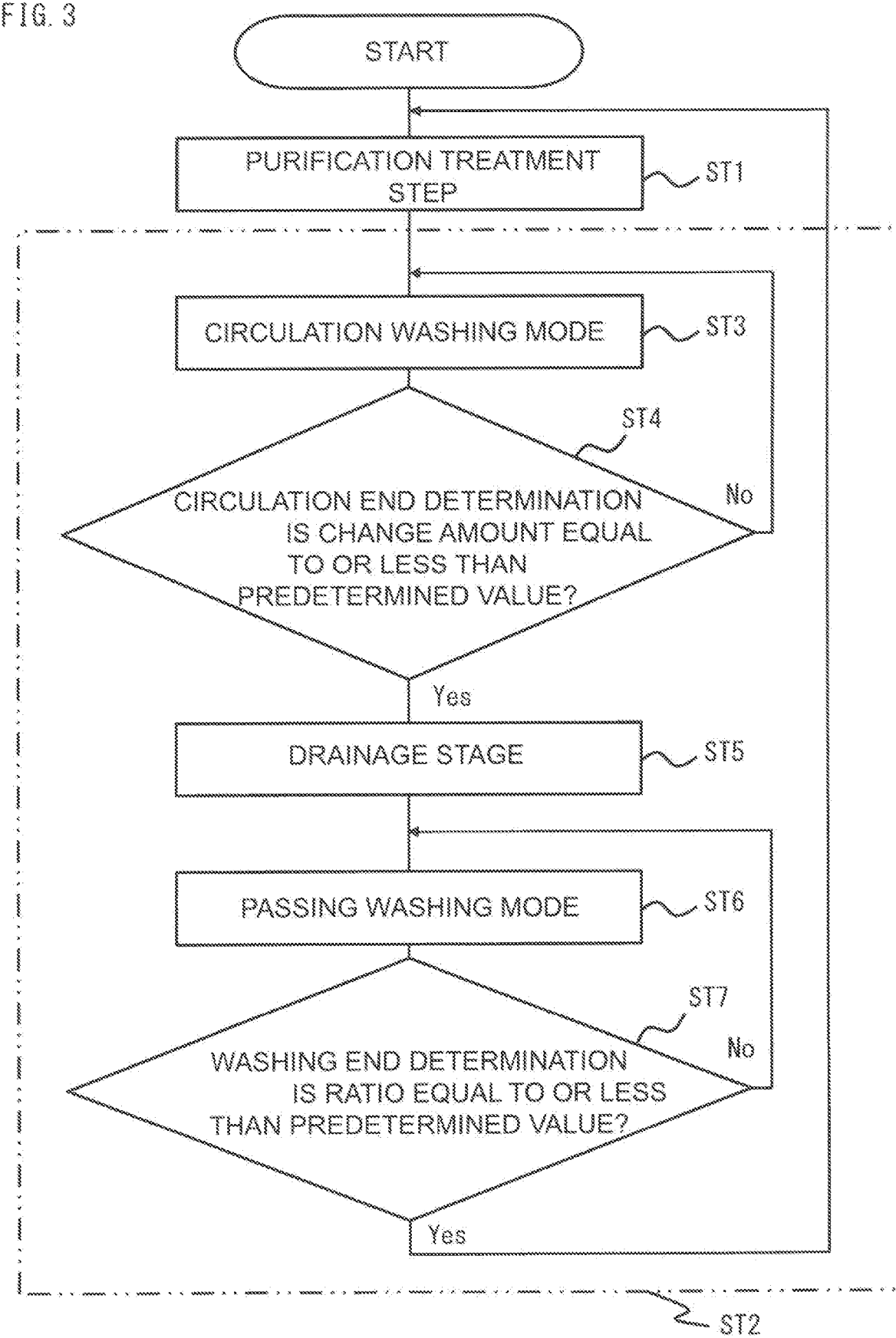
FIG. 3 is a flow chart showing the steps of a water treatment method according to embodiment 1 of the present invention.

Next, a water treatment method according to embodiment 1 is described. FIG. 3 is a flow chart showing a water treatment method according to embodiment 1 of the present invention. The water treatment method according to the present embodiment is performed by using the water treatment device 1 that has at least the treatment tank 2, the electrode units 7, the DC power supply 34, the control unit 12, the pump 5, and the examination unit 11 which have been described above. In the water treatment method, a purification treatment step ST1 and a washing step ST2 are alternately repeated. In the purification treatment step ST1, the ionic substance contained in the water in the treatment tank 2 is adsorbed by the electrode units 7, whereby the purification treatment is performed on the water in the treatment tank 2.

In the washing step ST2, the ionic substance is released from the electrode units 7 into the water in the treatment tank 2, whereby the porous electrodes 4, in particular, of the electrode units 7 are washed. Switching from the washing step ST2 to the purification treatment step ST1 is performed on the basis of an examination result by the examination unit 11 and an examination result by the upstream-side examination unit 31. It is noted that switching from the washing step ST2 to the purification treatment step ST1 may be performed on the basis of an examination result by the examination unit 11.

The washing step ST2 has a circulation washing mode ST3 and a passing washing mode ST6. As described above, the water treatment device 1 further has the circulation pipeline 6, and in the circulation washing mode ST3, the porous electrodes 4 are subjected to the washing treatment while water is guided via the circulation pipeline 6 from the downstream side of the treatment tank 2 to the upstream side of the treatment tank 2. That is, in the circulation washing mode ST3, water that has been caused to pass through the treatment tank 2 once is caused to pass through the treatment tank 2 again.

In the passing washing mode ST6, the porous electrodes 4 are washed while water on the upstream side of the treatment tank 2 is guided via the treatment tank 2, and not via the circulation pipeline 6, to the downstream side of the treatment tank 2. That is, in the passing washing mode ST6, water is caused to pass through the treatment tank 2 only once, and is not caused to circulate. Switching from the circulation washing mode ST3 to the passing washing mode ST6 is performed on the basis of an examination result by the examination unit 11. At least one of the circulation washing mode ST3 or the passing washing mode ST6 is performed between the purification treatment steps ST1 that are performed repeatedly.

In the present invention, mutual switching between the purification treatment step ST1 and the washing step ST2, and mutual switching between the circulation washing mode ST3 and the passing washing mode ST6 are performed by the control unit 12 described above.

Next, each treatment is specifically described. As shown in FIG. 3, after the start of the present treatment, the procedure is shifted to the purification treatment step ST1, and the purification treatment of water is performed. In the purification treatment step ST1, first, the downstream-side switching valve 15 is controlled by the control unit 12 into a state where the downstream-side switching valve 15 guides the flow path from the upstream side to the downstream side. The flow path switching valve 22 is controlled by the control unit 12 into a state where the flow path switching valve 22 guides the flow path on the downstream side of the treatment tank 2 to the concentrated salt water tank 21. Next, the upstream-side switching valve 16 is opened through control by the control unit 12, and the water in the treatment target water supply unit 13 is guided to the pump 5 and the treatment tank 2.

Next, the pump 5 is operated through control by the control unit 12, and the pipeline 25 on the upstream side of the treatment tank 2, the treatment tank 2, and the pipeline 26 on the downstream side of the treatment tank 2 are filled with the treatment target water. Next, the DC power supply 34 is activated through control by the control unit 12, and DC voltage is applied between the collector electrodes 3. As long as the pipelines at the positions where the examination unit 11 and the upstream-side examination unit 31 are installed are filled with the liquid, the examination unit 11 and the upstream-side examination unit 31 always continue measurement of electric conductivity of the liquid.

In the purification treatment step ST1, the direction of the DC voltage applied between the collector electrodes 3 is not changed in a single purification treatment step ST1. In the washing step ST2 following a single purification treatment step ST1, at least one of stop of the application of the DC voltage, short-circuiting, or reverse connection is performed. At this time, only stop of the DC voltage or short-circuiting may be performed. Alternatively, through reverse connection of the DC power supply, DC voltage in a direction reverse to the direction of the DC voltage applied in the purification treatment step ST1 may be temporarily applied. Accordingly, the ionic substance adsorbed by the porous electrodes 4 is actively released into the water due to repulsive force of the Coulomb force. In the washing step ST2 of the present embodiment, the DC voltage applied in the previous purification treatment step ST1 is short-circuited.

In the purification treatment step ST1, the direction of the DC voltage may be the same in all of a plurality of the purification treatment steps ST1. Alternatively, for example, the direction of the DC voltage may be reversed between a purification treatment step ST1 and the next purification treatment step ST1. It is sufficient that the direction determined in advance is not changed in a single purification treatment step ST1. In the present embodiment, the direction of the DC voltage is set to be the same in all of a plurality of the purification treatment steps ST1 that are repeated.

The water having already flowed out of the treatment tank 2 at the start of application of DC voltage between the collector electrodes 3 shows substantially the same electric conductivity as the treatment target water, and thus is stored in the concentrated salt water tank 21. The so-called initial flow is stored in the concentrated salt water tank 21. Then, when the electric conductivity, of treated water, obtained by the examination unit 11 becomes equal to or less than a predetermined value, the control unit 12 determines that the electric conductivity of the treated water has become equal to or less than the predetermined value. Then, the flow path switching valve 22 is switched through control by the control unit 12, and the treated water discharged from the treatment tank 2 is stored into the purified water tank 14. The predetermined value only needs to be equal to or less than the electric conductivity of the treatment target water, before the purification treatment, that is obtained by the upstream-side examination unit 31 or the examination unit 11 before the purification treatment.

This switching may be determined by the control unit 12 on the basis of both an examination result by the examination unit 11 and an examination result by the upstream-side examination unit 31. In this case, the control unit 12 receives the examination results by the upstream-side examination unit 31 and the examination unit 11. Then, when the control unit 12 has determined that the value obtained by dividing the examination result of the examination unit 11 by the examination result of the upstream-side examination unit 31 has become equal to or less than a predetermined value, the flow path switching valve 22 is switched through control by the control unit 12, and the treated water discharged from the treatment tank 2 is stored into the purified water tank 14. In this case, the predetermined value only needs to be 1 or smaller. Accordingly, the purified water tank 14 selectively stores water that has been subjected to the purification treatment in the treatment tank 2, i.e., water that has a low electric conductivity, out of the water discharged from the downstream side of the treatment tank 2. However, as for the switching of the flow path switching valve 22, the control unit 12 may determine that a time determined in advance with respect to the initial flow has elapsed, and the flow path switching valve 22 may be switched by the control unit 12.

In a case where the determination is performed only on the basis of the examination result by the examination unit 11 without using the examination result by the upstream-side examination unit 31, the control unit 12 calculates a change amount per unit time of the electric conductivity from the examination result of the examination unit 11, and determines a predetermined value in advance for the change amount per unit time of the electric conductivity, and this predetermined value may be used as a determination criterion. For example, with respect to a change amount of the electric conductivity for each minute, a predetermined value that serves as a determination criterion is set to a value that is equal to or greater than 0.001 [(mS/cm)/min] and equal to or less than 1 [(mS/cm)/min], for example.

In the present embodiment, as to whether to end the purification treatment step ST1 and shift to the next washing step ST2, or to continue the purification treatment step ST1, the control unit 12 determines whether or not a predetermined time determined in advance has elapsed, and the control unit 12 determines whether to end the purification treatment step ST1 and shift to the next washing step ST2, or to continue the purification treatment step ST1. Preferably, the predetermined time is set to be a value that is equal to or greater than 1 minute and equal to or less than 200 minutes, for example, and further preferably, set to be a value that is equal to or greater than 5 minutes and equal to or less than 150 minutes. The execution time period of the purification treatment step ST1 may be arbitrarily determined in accordance with the scale of the treatment and the required water quality. In a case where whether or not to end the purification treatment step ST1 is determined in accordance with the water quality, the determination may be performed on the basis of an examination result by the examination unit 11 or on the basis of both examination results by the examination unit 11 and the upstream-side examination unit 31.

When the predetermined time has elapsed, the purification treatment step ST1 is ended and the procedure is shifted to the next washing step ST2. As shown in FIG. 3, in the washing step ST2, the procedure is shifted to the circulation washing mode ST3. First, the drain valve 32 and the downstream-side switching valve 15 are controlled by the control unit 12, and in a state where the drain valve 32 is open, the flow path from the downstream side of the treatment tank 2 is directed to the circulation pipeline 6. Then, the circulation pipeline 6 is filled with water. Whether or not the circulation pipeline 6 has been filled with water may be determined on the basis of one or both of the time and the flow amount since the switching of the downstream-side switching valve 15. A sensor that detects that the circulation pipeline 6 is filled with water may be provided near the drain valve 32, and the control unit 12 having received the signal from the sensor may perform the determination on the basis of the signal from the sensor.

After the circulation pipeline 6 has been filled with water, the drain valve 32 is closed by the control unit 12. Further, through control of the upstream-side switching valve 16 by the control unit 12, the flow path directed from the treatment target water supply unit 13 toward the treatment tank 2 is switched to the flow path directed from the circulation pipeline 6 toward the treatment tank 2. In addition, after the circulation pipeline 6 has been filled with water, application of the DC voltage between the collector electrodes 3 is canceled through control of the DC power supply 34 by the control unit 12. That is, any of stop of the DC voltage, short-circuiting, and reverse connection is performed.

In the washing step ST2, DC voltage in a direction reverse to the direction of the DC voltage having been applied in the purification treatment step ST1 may be applied between the collector electrodes 3. In the present embodiment, by performing short-circuiting, electricity stored in the porous electrodes 4 and the collector electrodes 3 is discharged. In the present embodiment, any of stop of the application of the DC voltage, short-circuiting, and reverse connection is performed after the circulation pipeline 6 has been filled with water. However, stop of the DC voltage, short-circuiting, and reverse connection may be performed at the time point when the purification treatment step ST1 is ended.

As shown in FIG. 3, after the circulation washing mode ST3 has been started, a circulation end determination ST4 is performed. The circulation end determination ST4 is simultaneously performed in parallel with the circulation washing mode ST3, and the control unit 12 determines whether or not to end the circulation washing mode ST3 on the basis of an examination result by the examination unit 11. In the present embodiment, the control unit 12 receives an examination result by the examination unit 11, and the control unit 12 calculates a change amount per unit time from the examination result of the electric conductivity, obtained from the examination unit 11, of washing water being used in the circulation washing mode ST3. Then, when the change amount per unit time is equal to or less than a predetermined value determined in advance, the control unit 12 determines that the circulation washing mode ST3 should be ended. The predetermined value is set to be a value in advance in a range of, for example, equal to or greater than 0.001 [(mS/cm)/min] and equal to or less than 0.5 [(mS/cm)/min] as the change amount per unit time of the electric conductivity indicated by the examination unit 11.

The reason why the predetermined value as a criterion for determining that the circulation washing mode ST3 should be ended is set within this range, is as follows. If the change amount per unit time of the electric conductivity is greater than 0.5 [(mS/cm)/min], it means that the ionic substance is vigorously flowing out from the porous electrodes 4 into water. Therefore, in this case, the circulation washing mode ST3 should not be ended. When the change amount per unit time of the electric conductivity is smaller than 0.001 [(mS/cm)/min], it means that the ionic substance is hardly flowing out from the porous electrodes 4 into water. Thus, in this case, the circulation washing mode ST3 should not be continued. As to the determination of whether or not to end the circulation washing mode ST3, the control unit 12 may receive both an examination result by the examination unit 11 and an examination result by the upstream-side examination unit 31, and the control unit 12 may perform the determination on the basis of the examination result by the examination unit 11 and the examination result by the upstream-side examination unit 31.

When the control unit 12 has determined, in the circulation end determination ST4, that the circulation washing mode ST3 should not be ended, the circulation washing mode ST3 is continued. When it has been determined, in the circulation end determination ST4, that the circulation washing mode ST3 should be ended, the procedure is shifted to the next drainage stage ST5. In the drainage stage ST5, the water in the treatment tank 2 and the circulation pipeline 6 is discharged. In the drainage stage ST5, the drain valve 32 is opened and the pump 5 is activated through control by the control unit 12, whereby the water in the treatment tank 2 and the circulation pipeline 6 is discharged through the drain valve 32. For the drainage through the drain valve 32, an air valve that is opened through control by the control unit 12, thereby allowing flowing-in of outside air, is provided at a position in the circulation pipeline 6.

The water in the treatment tank 2 may be discharged through the pipeline 26 on the downstream side of the treatment tank 2, without using the drain valve 32. In this case, an air valve that allows, by being opened, flowing-in of outside air is provided at a place, in the circulation pipeline 6, as close as possible to the downstream-side switching valve 15, or at the downstream-side switching valve 15. Then, simultaneously with opening of the air valve, the downstream-side switching valve 15 causes the flow path from the downstream side of the treatment tank 2 to be directed to the downstream side of the downstream-side switching valve 15, thereby discharging the water in the treatment tank 2 and the circulation pipeline 6 by using the pump 5 or gravity. At this time, the control unit 12 opens the flow path switching valve 22 from the downstream-side switching valve 15 toward the concentrated salt water tank 21, whereby the discharged washing water is discharged toward the concentrated salt water tank 21.

The drainage method in the drainage stage ST5 is not limited thereto. For example, the discharge may be performed only through the pipeline 26 on the downstream side of the treatment tank 2. In a case where discharge is performed through the drain valve 32, an air valve that allows, by being opened, flowing-in of outside air may be provided between the upstream-side switching valve 16 and the pump 5. A plurality of the drain valves 32 may be provided in the circulation pipeline 6, and drainage may be performed through the drain valves 32. An air pump that forcedly takes in outside air may be provided on the upstream side in the vicinity of the treatment tank 2, and outside air may be caused to flow into the treatment tank 2 by the air pump, thereby discharging the water in the treatment tank 2. An air valve and a drain valve may be provided to the treatment tank 2, thereby discharging the water in the treatment tank 2.

Next, the procedure is shifted to the passing washing mode ST6, and water from the treatment target water supply unit 13 is guided, not via the circulation pipeline 6, to the pipeline 25 on the upstream side of the treatment tank 2, the treatment tank 2, and the pipeline 26 on the downstream side of the treatment tank 2, whereby washing of the porous electrodes 4 is performed. In the passing washing mode ST6, first, the control unit 12 controls the pump 5, the drain valve 32, the upstream-side switching valve 16, and the downstream-side switching valve 15, and in a state where the drain valve 32 is open, water from the treatment target water supply unit 13 is guided to the circulation pipeline 6, whereby air present from the upstream-side switching valve 16 to the downstream-side switching valve 15 is vented. In the passing washing mode ST6 after the drainage stage ST, when the treated water is used as the washing water, the control unit 12 controls the pump 5, the drain valve 32, the upstream-side switching valve 16, the downstream-side switching valve 15, and the return switching valve 24, and in a state where the drain valve 32, is open, the treated water is guided from the purified water tank 14 to the circulation pipeline 6, whereby air present from the upstream-side switching valve 16 to the downstream-side switching valve 15 is vented. This treatment will be referred to as a "passing washing preparation stage".

In the work of venting air, air may not necessarily be vented through the drain valve 32. Instead, through control of the downstream-side switching valve 15 and the flow path switching valve 22, the flow path from the treatment tank 2 is connected to the flow path to the concentrated salt water tank 21, and water is sent by the pump 5, whereby air may be vented through the concentrated salt water tank 21. Further, an air venting valve may be provided to the pipeline 26 on the downstream side of the treatment tank 2, thereby venting air. Then, the downstream-side switching valve 15 and the flow path switching valve 22 are controlled, to direct the water from the treatment tank 2 toward the concentrated salt water tank 21.

The above-described venting of the air present from the upstream-side switching valve 16 to the downstream-side switching valve 15 is ended when the control unit 12 has determined that a predetermined time has elapsed. After the air venting has been performed, the control unit 12 opens the upstream-side switching valve 16 from the upstream-side examination unit 31 toward the treatment tank 2, opens the downstream-side switching valve 15 from the treatment tank 2 toward the flow path switching valve 22, and opens the flow path switching valve 22 from the downstream-side switching valve 15 toward the concentrated salt water tank 21. When the treatment target water is used as the washing water, the control unit 12 opens the return switching valve 24 from the treatment target water supply unit 13 toward the upstream-side switching valve 16. When the treated water is used as the washing water, the control unit 12 opens the return switching valve 24 from the purified water tank 14 toward the upstream-side switching valve 16.

As shown in FIG. 3, when the passing washing mode ST6 is started, the next washing end determination ST7 is performed. The washing end determination ST7 is simultaneously performed in parallel with the passing washing mode ST6, and the control unit 12 receives an examination result by the examination unit 11, and the control unit 12 determines whether or not to end the washing step ST2 on the basis of the examination result. This determination may be performed only on the basis of an examination result by the examination unit 11. In the present embodiment, the washing end determination is performed on the basis of both an examination result by the examination unit 11 and an examination result by the upstream-side examination unit 31.

In the passing washing mode ST6 of the washing step ST2, water that has flowed into the treatment tank 2 is not subjected to the purification treatment in the treatment tank 2. Thus, the electric conductivity indicated by the examination result by the examination unit 11 becomes a value equivalent to or greater than the electric conductivity indicated by the examination result by the upstream-side examination unit 31. Therefore, a value obtained by dividing the electric conductivity indicated by the examination result of the examination unit 11 by the electric conductivity indicated by the examination result of the upstream-side examination unit 31, i.e., the ratio between the electric conductivity indicated by the examination result of the examination unit 11 and the electric conductivity indicated by the examination result of the upstream-side examination unit 31, is 1 or greater.

The control unit 12 calculates the ratio between the electric conductivity indicated by the examination result of the examination unit 11 and the electric conductivity indicated by the examination result of the upstream-side examination unit 31. Then, using this value as a determination criterion, the control unit 12 sets in advance a predetermined value that is equal to or greater than 1 and equal to or less than 20, for example. Then, when a value obtained by dividing the electric conductivity indicated by the examination unit 11 by the electric conductivity indicated by the upstream-side examination unit 31 becomes equal to or less than the predetermined value, the control unit 12 determines that the washing step ST2 should be ended. The reason why the predetermined value as the determination criterion is set to a value within the range of equal to or greater than 1 and equal to or less than 20, is as follows. If a value obtained by dividing the electric conductivity indicated by the examination unit 11 by the electric conductivity indicated by the upstream-side examination unit 31 exceeds 20, it means that water having a high ion concentration remains in the treatment tank 2. Therefore, in this case, the washing step ST2 should not be ended.

When the control unit 12 has determined, in the washing end determination ST7, that the washing step ST2 should not be ended, the passing washing mode ST6 is continued. When the control unit 12 has determined, in the washing end determination ST7, that the washing step ST2 should be ended, the procedure is shifted to the purification treatment step ST1.

According to embodiment 1 of the present invention, the control unit 12 determines switching from release of the ionic substance from the electrode units 7, to adsorption of the ionic substance by the electrode units 7, on the basis of the examination result by the examination unit 11. Thus, the washing treatment of the electrode units 7 can be restricted to a necessary and sufficient time period. Therefore, the operation rate of the purification treatment of water can be prevented from being needlessly reduced. In addition, it is possible to prevent resumption of the purification treatment of water in a state where release of the ionic substance from the electrode units 7 is insufficient. Thus, the water quality after the purification treatment can be prevented from being reduced.

According to embodiment 1 of the present invention, the water treatment device 1 has the circulation pipeline 6 that guides the flow path from the downstream side of the treatment tank 2 and the pump 5 to the upstream side of the treatment tank 2 and the pump 5. Therefore, when compared with a case where the water treatment device 1 does not have the circulation pipeline 6, the amount of liquid necessary for releasing the ionic substance from the electrode units 7 can be reduced. Since the water treatment device 1 is provided with the downstream-side switching valve 15 and the upstream-side switching valve 16, the control unit 12 can switch between the flow path from the treatment tank 2 and the flow path to the treatment tank 2, by switching the downstream-side switching valve 15 and the upstream-side switching valve 16. Accordingly, both directing the water in the treatment tank 2 toward the purified water tank 14, and directing again the water via the circulation pipeline 6 to the treatment tank 2 can be realized. At this time, the flow path switching valve 22 may also be able to be switched by the control unit 12.

According to embodiment 1 of the present invention, since the water treatment device 1 has the return pipeline 23, the treated water in the purified water tank 14 can be used in the washing step ST2 of releasing the ionic substance from the electrode units 7. Accordingly, when compared with a case where the electrode units 7 are subjected to the washing treatment using the treatment target water, release of the ionic substance from the electrode units 7 can be efficiently performed. When the treated water in the purified water tank 14 is further subjected to the purification treatment in the treatment tank 2, treated water having high purity can be obtained.

According to embodiment 1 of the present invention, since the water treatment device 1 has the drain valve 32, the water in the circulation pipeline 6 can be discharged through the drain valve 32 after the washing treatment of the electrode units 7. This allows preparation for filling the circulation pipeline 6 with water having a water quality that is suitable for the next treatment. When compared with a case where drainage is performed only from the downstream side of the treatment tank 2, the water in the circulation pipeline 6 can be quickly discharged.

According to embodiment 1 of the present invention, the control unit 12 determines switching from release of the ionic substance from the electrode units 7 in the treatment tank 2, to adsorption of the ionic substance in water, on the basis of both an examination result by the examination unit 11 and an examination result by the upstream-side examination unit 31. Thus, when compared with a case where the determination is performed only on the basis of an examination result by the examination unit 11, the control can be performed with high accuracy.

According to embodiment 1 of the present invention, the electrode units 7 have a pair of collector electrodes 3 and a pair of porous electrodes 4, and the collector electrodes 3 and the porous electrodes 4 are separated by the separator 45. Thus, adsorption of the ionic substance by each electrode unit 7 can be performed through formation of an electrical double layer due to Coulomb force. Therefore, by performing short-circuiting between the pair of collector electrodes 3, the ionic substance adsorbed by the porous electrodes 4 can be quickly released into water. Accordingly, when compared with a case where the ionic substance is adsorbed by the electrode units 7 through ionic bond or the like, adsorption and release of the ionic substance by the electrode units 7 can be performed at high efficiency.

According to embodiment 1 of the present invention, switching from the washing step ST2 to the purification treatment step ST1 is performed on the basis of an examination result by the examination unit 11. Thus, the washing step ST2 can be restricted to a necessary and sufficient time period. Therefore, the operation rate of the purification treatment of water can be prevented from being needlessly reduced. In addition, it is possible to prevent shifting to the purification treatment step ST1 in a state where the washing treatment of the electrode units 7 in the washing step ST2 is insufficient. Thus, the water quality after the purification treatment in the purification treatment step ST1 can be prevented from being reduced.

According to embodiment 1 of the present invention, the water treatment method has the circulation washing mode ST3. Thus, when compared with a case where the water treatment method does not have the circulation washing mode ST3, the amount of liquid necessary for the washing treatment of the electrode units 7 can be reduced. Since the switching from the circulation washing mode ST3 through the drainage stage ST5 to the passing washing mode ST6 is performed on the basis of examination results by the examination unit 11, the circulation washing mode ST3 can be restricted to a necessary and sufficient time period. Thus, the operation rate of the purification treatment of water can be prevented from being needlessly reduced. In addition, it is possible to prevent resumption of the purification treatment step ST1 in a state where the circulation washing mode ST3 is insufficient. Thus, the water quality after the purification treatment can be prevented from being reduced.

According to embodiment 1 of the present invention, in the washing step ST2, the electrode units 7 are washed by using at least a part of the treated water in the purified water tank 14. Thus, when compared with a case where the washing is performed by using the treatment target water, the electrode units 7 can be sufficiently washed in a short time.

According to embodiment 1 of the present invention, in the purification treatment step ST1, whether or not to store the treated water obtained through the purification treatment into the purified water tank is determined on the basis of an examination result by the examination unit 11. In the purification treatment step ST1, especially in an initial stage, there are cases where impurity from the porous electrodes 4 caused by the washing treatment of the electrode units 7 remains in the water treatment device 1. Even in such a case, whether or not to perform storage into the purified water tank 14 is determined on the basis of the examination result. Thus, water that contains impurity from the electrode units 7 can be prevented from being stored into the purified water tank 14.

In the water treatment device 1 in embodiment 1, an example of CDI using the granular porous electrodes 4 has been shown. However, any CDI can be employed in which: at least a pair of electrodes are provided; DC voltage or DC current is applied between the electrodes; and ions in treatment target water are adsorbed by the electrodes, thereby removing the ionic substance from water.

In embodiment 1, the pump 5 is provided on the upstream side of the treatment tank 2 in the route determined in advance. However, the pump 5 may be provided on the downstream side of the pump. In embodiment 1, the return pipeline 23 guides the treated water in the purified water tank 14 to the pipeline 25 on the upstream side of the treatment tank 2. However, the present invention is not limited thereto. The return pipeline 23 may guide the treated water in the purified water tank 14 to the circulation pipeline 6. In addition, the following configuration may be employed: a water tank of which a flow path is connected to the pipeline on the upstream side of the treatment tank 2 and the pump 5 is separately provided; a return pump for transporting the water in the return pipeline 23 is further provided separately; and at least a part of the treated water in the purified water tank is supplied to the water tank by means of the return pump via the return pipeline 23. Through this configuration, the treated water in the purified water tank 14 can be guided to the treatment tank 2 via the return pipeline 23.

In embodiment 1, an example in which the porous electrodes 4 are formed of particulate activated carbon has been described. However, the material forming the porous electrodes 4 is not limited to particulate activated carbon. For example, the material may be any of a non-particulate porous carbon member, porous conductive beads, a porous metal, activated carbon fibers, an activated carbon nonwoven fabric, an activated carbon sheet, and carbon aerogel. The porous electrodes 4 may be each obtained by processing particulate activated carbon into a plate shape or a sheet shape. However, as in embodiment 1, the particulate activated carbon in a state of being packed between the collector electrodes 3 and the separator 45 can be used in the purification treatment of water. In order to prevent the porous electrodes 4 from flowing out of the treatment tank 2, a flow-out prevention member that allows passage of liquid and that inhibits passage of a solid component may be provided in the vicinity of the boundary between the treatment tank 2 and the pipeline 26 on the downstream side. The flow-out prevention member may be provided in the vicinity of the boundary between the treatment tank 2 and the pipeline 25 on the upstream side, and may be provided in a portion through which air flows into the treatment tank 2. When the drain valve 32 is provided to the treatment tank 2, the flow-out prevention member may be provided also to the drain valve 32. That is, in order to prevent the porous electrodes 4 from flowing out of the treatment tank 2, the flow-out prevention member may be provided at a place through which a fluid flows into the treatment tank 2, a place through which a liquid flows or is discharged out of the treatment tank 2, and a place through which air might flow in and out. The flow-out prevention member may have a different shape and material in accordance with the porous electrodes 4 that are used.

One or more of an ion exchange resin, an ion exchange membrane, and a semipermeable membrane may be disposed between the pair of collector electrodes 3. One or both of the separator 45 and the porous electrode 4 on the separator 45 side may be coated by using an ion exchange resin or an ion exchange group.

In the water treatment method according to embodiment 1, whether or not to end the purification treatment step ST1 is determined by the control unit 12 on the basis of whether or not a predetermined time has elapsed. However, the present invention is not limited to this configuration. For example, on the basis of an examination result by the examination unit 11, the determination that the purification treatment step ST1 should be ended may be made when: the electric conductivity indicated by the examination result of the examination unit 11 has reached a minimum value and then increased thereafter; and the electric conductivity has increased to a predetermined value determined in advance. Alternatively, the determination that the purification treatment step ST1 should be ended may be made when the electric conductivity indicated by the examination result of the examination unit 11 has become a predetermined value determined in advance.

Whether or not to end the purification treatment step ST1 may be determined on the basis of examination results of both the examination unit 11 and the upstream-side examination unit 31. In that case, for example, a value in a range of 0.1 to 0.9 is set as a predetermined value for the ratio of the electric conductivities. Then, when the electric conductivity indicated by the examination unit 11 has become equal to or greater than the predetermined-value times the electric conductivity indicated by the upstream-side examination unit 31, the determination that the purification treatment step ST1 should be ended may be made. In general, the electric conductivity as an examination result by the examination unit 11 decreases once in accordance with the electrode units 7 beginning to effectively function in the treatment tank 2, and increases again when a local minimum value has been reached. This increase is caused by decrease in the adsorption efficiency per unit time of the electrode units 7 due to adsorption of the ionic substance to the porous electrodes 4. Therefore, using as a reference the electric conductivity at the time when the examination result by the examination unit 11 has reached a local minimum value, when an electric conductivity that exceeds the predetermined-value times the reference has been detected, the purification treatment step ST1 may be ended. Accordingly, the purification treatment step ST1 can be performed while the electrode units 7 are most effectively functioning. Alternatively, a predetermined value as the electric conductivity is determined in advance, and when the examination result by the examination unit 11 has once become a value lower than the predetermined value and then has exceeded the predetermined value, the determination that the purification treatment step ST1 should be ended may be made. The predetermined value as the electric conductivity at this time is set to a value equal to or less than an electric conductivity that is predicted to be indicated by the upstream-side examination unit 31.

When there is a target value for the electric conductivity of the treated water, an average value of examination results in a certain time period of the examination unit 11 is obtained, for example, and the determination that the purification treatment step ST1 should be ended may be made on the basis of the average value. For example, a value in a range of 0.8 times to 1.0 times of the target value is set as a predetermined value, and when the average value has become equal to or less than the predetermined value, the determination that the purification treatment step ST1 should be ended may be made.

In embodiment 1, the washing step ST2 includes the circulation washing mode ST3, the drainage stage ST5 thereafter, and the passing washing mode ST6 thereafter. However, the present invention is not limited to this configuration. For example, a washing mode may be configured to include a passing washing mode, a circulation washing mode thereafter, and a passing washing mode performed again thereafter. Immediately after the start of the washing step ST2 for the porous electrodes 4, the washing of the porous electrodes 4 could cause the water used in the washing to quickly contain a lot of impurity. Thus, if the passing washing mode is performed before the circulation washing mode ST3, the next circulation washing mode ST3 can be performed by using water that is different from the water immediately after the start of the washing step ST2. Accordingly, the circulation washing mode ST3 can be performed by using water that contains less impurity. Even if the water used in the circulation washing mode ST3 remains in the water treatment device 1, the water can be removed through the passing washing mode ST6 after the circulation washing mode ST3. Thus, the purification treatment step ST1 thereafter can be performed in the treatment tank 2 from which the impurity has been removed. The circulation washing mode ST3 and the passing washing mode ST6 may be performed a plurality of times between a purification treatment step ST1 and the next purification treatment step ST1. At that time, the determination criterion for ending the circulation washing mode ST3 and the determination criterion for ending the passing washing mode ST6 may be different from the determination criteria of the previous time.

In embodiment 1, the determination regarding the circulation washing mode ST3 is performed on the basis of an examination result by the examination unit 11. However, for example, a storage device that stores and accumulates the lengths of the time periods of the circulation washing mode ST3 performed in the past is provided, and the execution time period of the circulation washing mode ST3 may be determined on the basis of the lengths of the time periods stored and accumulated in the storage device. For example, the control unit 12 may perform a process or the like in which an average value of the lengths of the time periods of the circulation washing mode ST3 performed in the past is set as the execution time period of the circulation washing mode ST3. In addition, ending of each of the purification treatment step ST1 and the passing washing mode ST6 may be determined on the basis of the length of the execution time period thereof.

In the passing washing mode ST6 in the embodiment, water from the treatment target water supply unit 13 is guided to the circulation pipeline 6. However, when venting air in the circulation pipeline 6 in the passing washing mode ST6, tap water may be used instead of the treatment target water. In addition, for example, in the washing step ST2, water having a low electric conductivity such as tap water may be used as the washing water.

In embodiment 1 described above, an example has been described in which mutual switching between the purification treatment step ST1 and the washing step ST2, and mutual switching between the circulation washing mode ST3 and the passing washing mode ST6 are performed by the control unit 12. However, the present invention is not limited to the example. The switching may be manually realized. If such manual operation is employed, an effect of facilitating device configuration can be exhibited.

Embodiment 2

Figure 4:
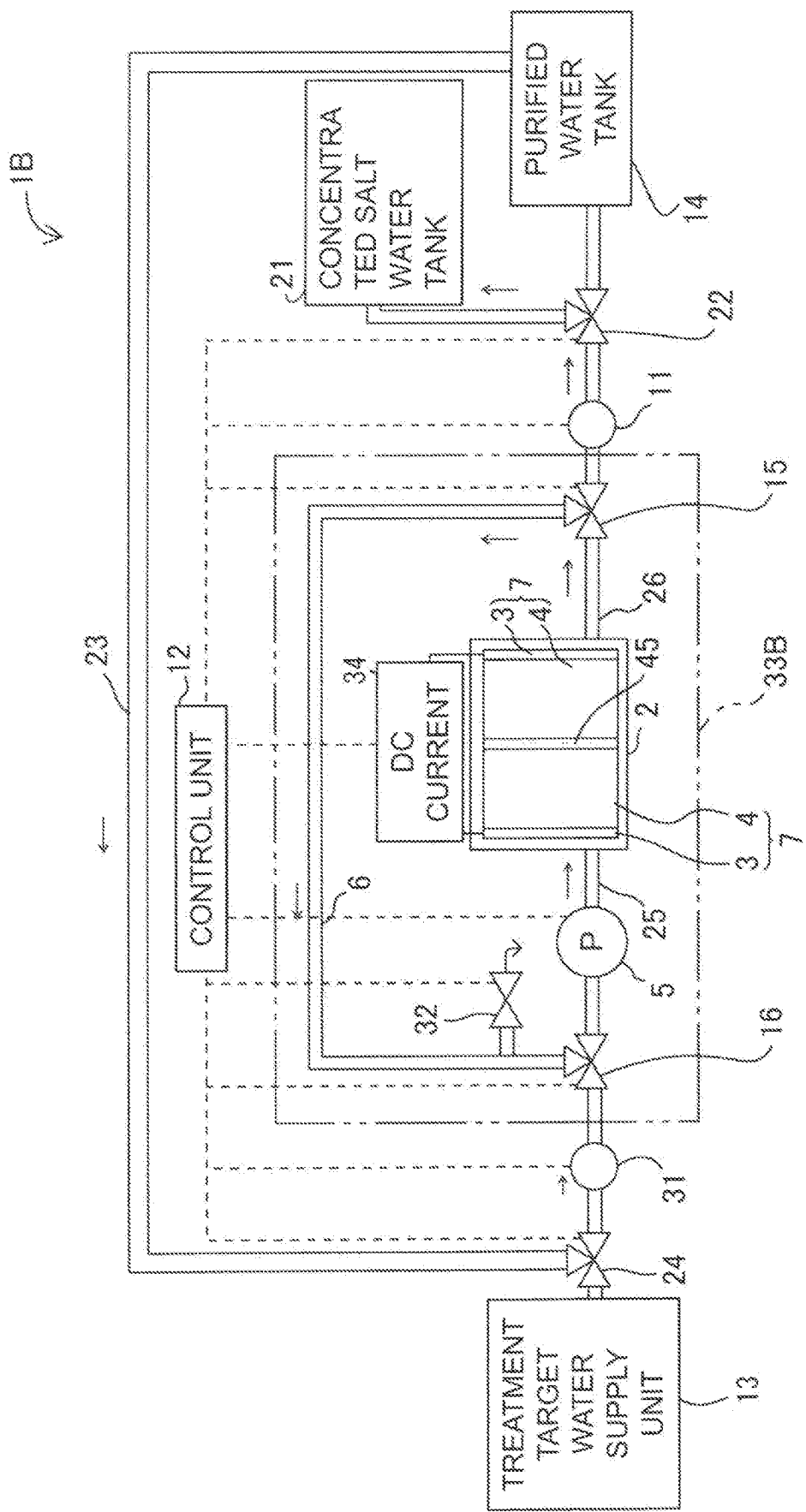
FIG. 4 shows a configuration of a water treatment device according to embodiment 2 of the present invention.

Next, a water treatment device 1B and a water treatment method according to embodiment 2 of the present invention will be described below with reference to the drawings. Embodiment 2 is similar to embodiment 1 described above, and in the following, differences of embodiment 2 from embodiment 1 are mainly described. FIG. 4 shows a configuration of the water treatment device 1B according to embodiment 2 of the present invention.

Figure 5:
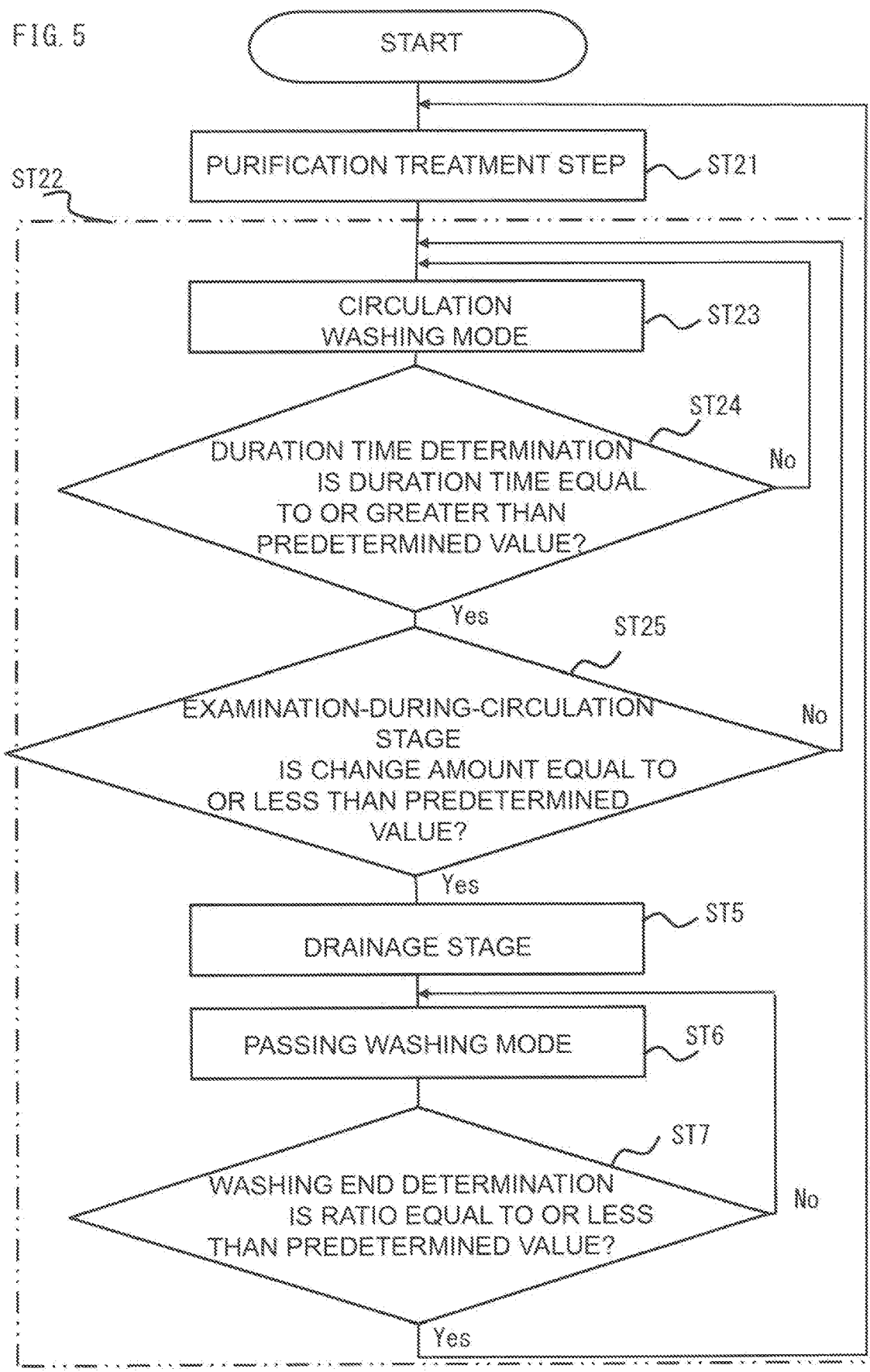
FIG. 5 is a flow chart showing the steps of the water treatment method according to embodiment 2 of the present invention.

As shown in FIG. 4, in the present embodiment, the examination unit 11 is provided on the downstream side of the downstream-side switching valve 15 and on the upstream side of the flow path switching valve 22. FIG. 5 is a flow chart showing the steps of the water treatment method according to embodiment 2 of the present invention. The examination unit 11 in the present embodiment can always examine the water quality in a purification treatment step ST21 and the passing washing mode ST6, but does not always examine the water quality in a circulation washing mode ST23.

As shown in FIG. 5, in the water treatment method of the present embodiment, first, the procedure is shifted to the purification treatment step ST21 and purification treatment of water is performed. The purification treatment step ST21 is the same as the purification treatment step ST1 in embodiment 1. Next, the procedure is shifted to a washing step ST22. In the washing step ST22, first, the procedure is shifted to the circulation washing mode ST23, and washing of the porous electrodes 4 is performed while water is circulated in a circulation unit 33B. In the circulation washing mode ST23, examination by the examination unit 11 is not performed, and a duration time determination ST24 is simultaneously performed in parallel. In the duration time determination ST24, the control unit 12 measures the duration time from the start of the circulation washing mode ST23, and the control unit 12 determines whether or not the duration time has become equal to or greater than a predetermined time determined in advance.

When the control unit 12 has determined that the duration time from the start of the circulation washing mode ST23 has not become equal to or greater than the predetermined time, the circulation washing mode ST23 is continued. When the control unit 12 has determined that the duration time from the start of the circulation washing mode ST23 has become equal to or greater than the predetermined time, the procedure is shifted to the next examination-during-circulation stage ST25. In the examination-during-circulation stage ST25, the downstream-side switching valve 15 is temporarily opened by the control unit 12, a part of the water flowing in the circulation unit 33B is caused to flow to the downstream of the downstream-side switching valve 15, and is examined by the examination unit 11. When an amount of water necessary for examination by the examination unit 11 cannot be caused to flow to the downstream side only by opening the downstream-side switching valve 15, the upstream-side switching valve 16 may be temporarily opened in the direction from the treatment target water supply unit 13 toward the pump 5 by the control unit 12, simultaneously with the downstream-side switching valve 15. The operation of the examination-during-circulation stage ST25 is performed once per minute, for example.

In the examination-during-circulation stage ST25, the control unit 12 determines whether or not to end the circulation washing mode ST23. The determination criterion at this time may be the same as that in the circulation end determination ST4 in embodiment 1. However, in embodiment 2, the control unit 12 receives examination results of both the examination unit 11 and the upstream-side examination unit 31, and the control unit 12 determines whether or not to end the circulation washing mode ST23 on the basis of these examination results. For example, a real number in a range of 1.0 to 10.0 is set as a predetermined value for the ratio of the electric conductivities. Then, when the electric conductivity indicated by the examination unit 11 has become equal to or less than the predetermined-value times the electric conductivity indicated by the upstream-side examination unit 31, the control unit 12 determines that the circulation washing mode ST23 should be ended. The ratio between the electric conductivity indicated by the examination unit 11 and the electric conductivity indicated by the upstream-side examination unit 31 is calculated by the control unit 12.

The reason why the predetermined value as the criterion for determining whether or not to end the circulation washing mode ST23 is set in this range, is as follows. If the electric conductivity indicated by the examination unit 11 is greater than 10.0 times the electric conductivity indicated by the upstream-side examination unit 31, release of the ionic substance from the porous electrodes 4 into the water is hardly occurring in the treatment tank 2. If the circulation washing mode ST23 is continued in this 1.5 state, the operation rate could be unnecessarily reduced. Therefore, the predetermined value should not be set to a value greater than 10.0. The determination as to whether or not to end the circulation washing mode ST23 may be performed on the basis of only the examination result by the examination unit 11. In this case, a predetermined value as the electric conductivity is set in advance, and when the examination result by the examination unit 11 has exceeded the predetermined value, it is determined that the circulation washing mode ST23 should be ended.

When the control unit 12 has determined, in the examination-during-circulation stage ST25, that the circulation washing mode ST23 should not be ended, the circulation washing mode ST23 is continued. Thereafter, the circulation washing mode ST23 is further performed, and after the predetermined time has elapsed, the procedure is shifted to the examination-during-circulation stage ST25, and the control unit 12 determines whether or not to shift to the drainage stage ST5. When the control unit 12 has determined, in the examination-during-circulation stage ST25, that the circulation washing mode ST23 should be ended, the procedure is shifted to the next drainage stage ST5. The drainage stage ST5 to the washing end determination ST7 are the same as those in embodiment 1. When the examination-during-circulation stage ST25 is repeatedly performed, the duration time for which a circulation washing mode ST23 is continued may be set to be different from the duration time of the previous circulation washing mode ST23.

In the water treatment device 1B according to embodiment 2, the examination unit 11 is provided on the downstream side of the downstream-side switching valve 15 and on the upstream side of the flow path switching valve 22. Thus, this configuration is applicable to a case where the examination unit 11 cannot be provided in the circulation unit 33B. For example, when the water treatment device 1B is required to be downsized, the examination unit 11 can be provided outside the circulation unit 33B. Thus, the degree of freedom in designing can be improved. In addition, when compared with a case where the examination unit 11 is provided on the upstream side of the downstream-side switching valve 15 as in embodiment 1, the circulation pipeline 6 can be shortened. Thus, the use amount of water in the washing step ST22 can be suppressed, and the scale of the circulation unit 33B can be reduced. Therefore, according to the configuration of embodiment 2, the circulation unit 33B can be downsized by both the suppression of the use amount of water in the washing step ST22 and the installation of the examination unit 11 outside the circulation unit 33B. Thus, the entirety of the water treatment device 1B can also be downsized.

In the water treatment device 1B according to embodiment 2, the examination unit 11 is provided on the downstream side of the downstream-side switching valve 15. Thus, when compared with a case where the examination unit 11 is provided inside the circulation unit 33B, it is possible to reduce the chances of the examination unit 11 coming into contact with water in which the electric conductivity has been increased in the treatment tank 2 during the circulation washing mode ST23. Therefore, stability of the examination unit 11 can be improved.

Embodiment 3

Figure 6:
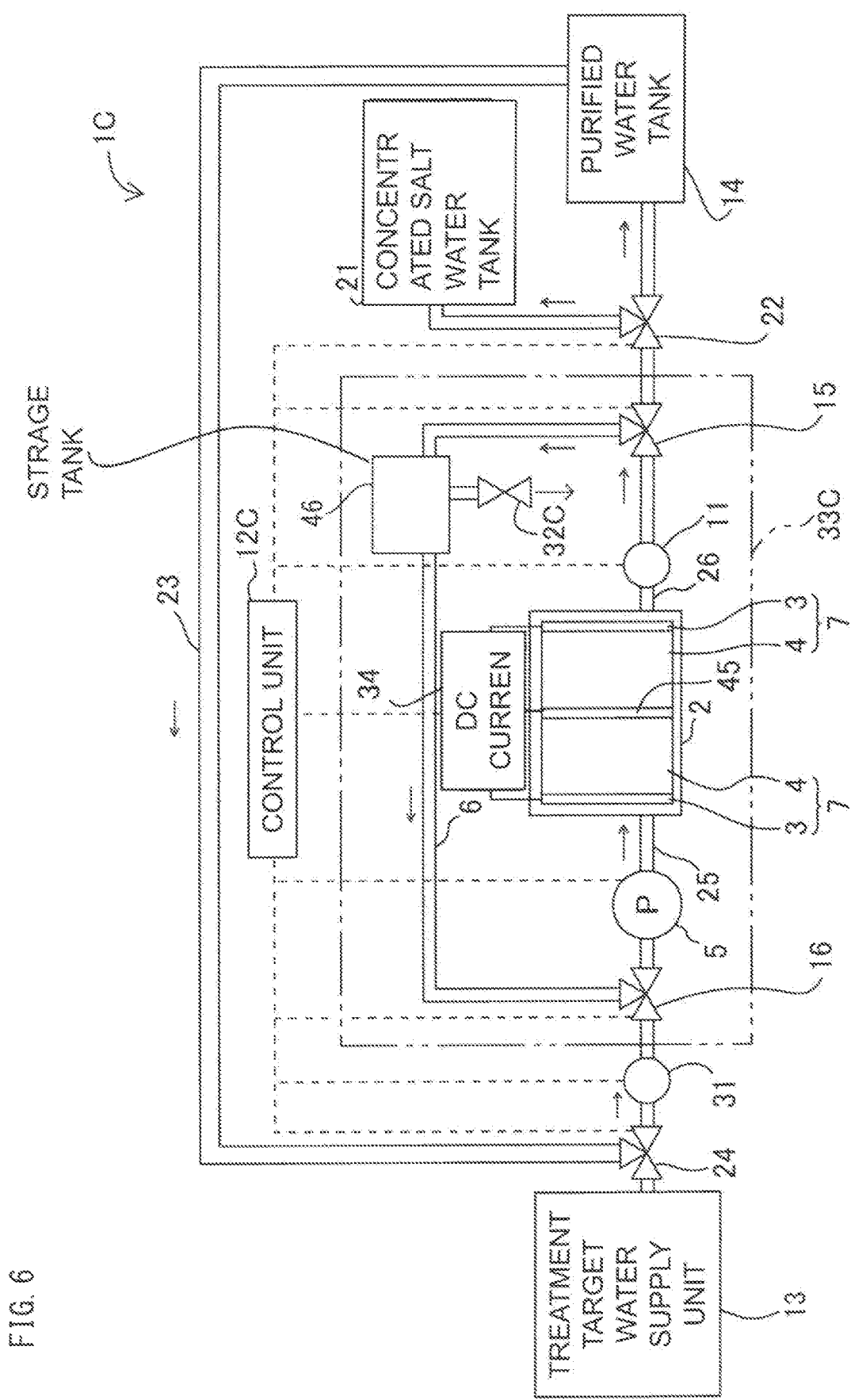
FIG. 6 shows a configuration of a water treatment device according to embodiment 3 of the present invention.

Next, a water treatment device 1C according to embodiment 3 of the present invention will be described below with reference to the drawings. Embodiment 3 is similar to embodiment 1 described above, and in the following, differences of embodiment 3 from embodiment 1 are mainly described. FIG. 6 shows a configuration of the water treatment device 1C according to embodiment 3 of the present invention.

In the present embodiment, the water treatment device 1C has a storage tank 46 at a position in the circulation pipeline 6. The storage tank 46 is provided with a drain valve 32C. Similar to the drain valve 32 in embodiment 1, the drain valve 32C is controlled by a control unit 12C, and allows, by being opened, discharge of water in the circulation pipeline 6. The storage tank 46 can change the amount of water stored therein. When the amount of water in the storage tank 46 is changed, the amount of water flowing in a circulation unit 33C is changed. The storage tank 46 may be provided with a water level sensor or the like. Accordingly, when a part of water flowing in the circulation unit 33C is to be taken out to the outside, it is no longer necessary to cause water to flow in from the upstream side of the upstream-side switching valve 16. Thus, the degree of freedom in examination and the like can be improved. A water quality examination unit may be provided in the storage tank 46, for water quality examination of washing water in the storage tank 46. When the water quality examination unit is provided, water quality examination of the washing water in the circulation washing mode ST23 can be performed by the water quality examination unit.

When, at the start of the circulation washing mode of the washing step ST2, a predetermined amount of washing water to be used in the circulation washing mode is stored in the storage tank 46, the amount of washing water that circulates can be arbitrarily changed. In FIG. 6, the purified water tank 14 is connected to the pipeline 25 on the upstream side by the return switching valve 24. However, if the purified water tank 14 is connected to the storage tank 46 via, for example, a valve and a transfer means such as a pump, the treated water can be used as a part or all of the washing water in the washing step ST2. For example, when a predetermined amount of the treated water is transferred from the purified water tank 14 to the storage tank 46 at the start of the circulation washing mode, the treated water can be used as the washing water in the circulation washing mode. Further, when a predetermined amount of the treated water is transferred from the purified water tank. 14 to the storage tank 46, the upstream-side switching valve 16 is opened from the circulation pipeline 6 toward the pump 5, and the downstream-side switching valve 15 is opened from the examination unit 11 toward the flow path switching valve 22, the treated water can be used as the washing water also in the passing washing mode.

In a case where air remains in the circulation pipeline 6, such as when water is discharged from the circulation pipeline 6 and then water is guided thereinto again, the air remaining in the circulation pipeline 6 can be vented in the storage tank 46. When the control unit 12C rapidly increases the flow amount at the pump 5, air in the treatment tank 2 and the circulation unit 33C reaches the storage tank 46, and air remaining in the circulation pipeline 6 can be vented in the storage tank 46.

Since the drain valve 32C is provided to the storage tank 46, the water in the circulation pipeline 6 can be discharged through the drain valve 32C provided to the storage tank 46. Thus, when compared with a case where water is discharged from only the downstream side of the treatment tank 2, the water in the storage tank 46 can be quickly discharged. Therefore, even if a large amount of water is present in the storage tank 46, it is possible to prevent reduction in the operation rate of the water treatment device 1C due to a lot of time being taken for discharge of water.

Embodiment 4

Figure 7:
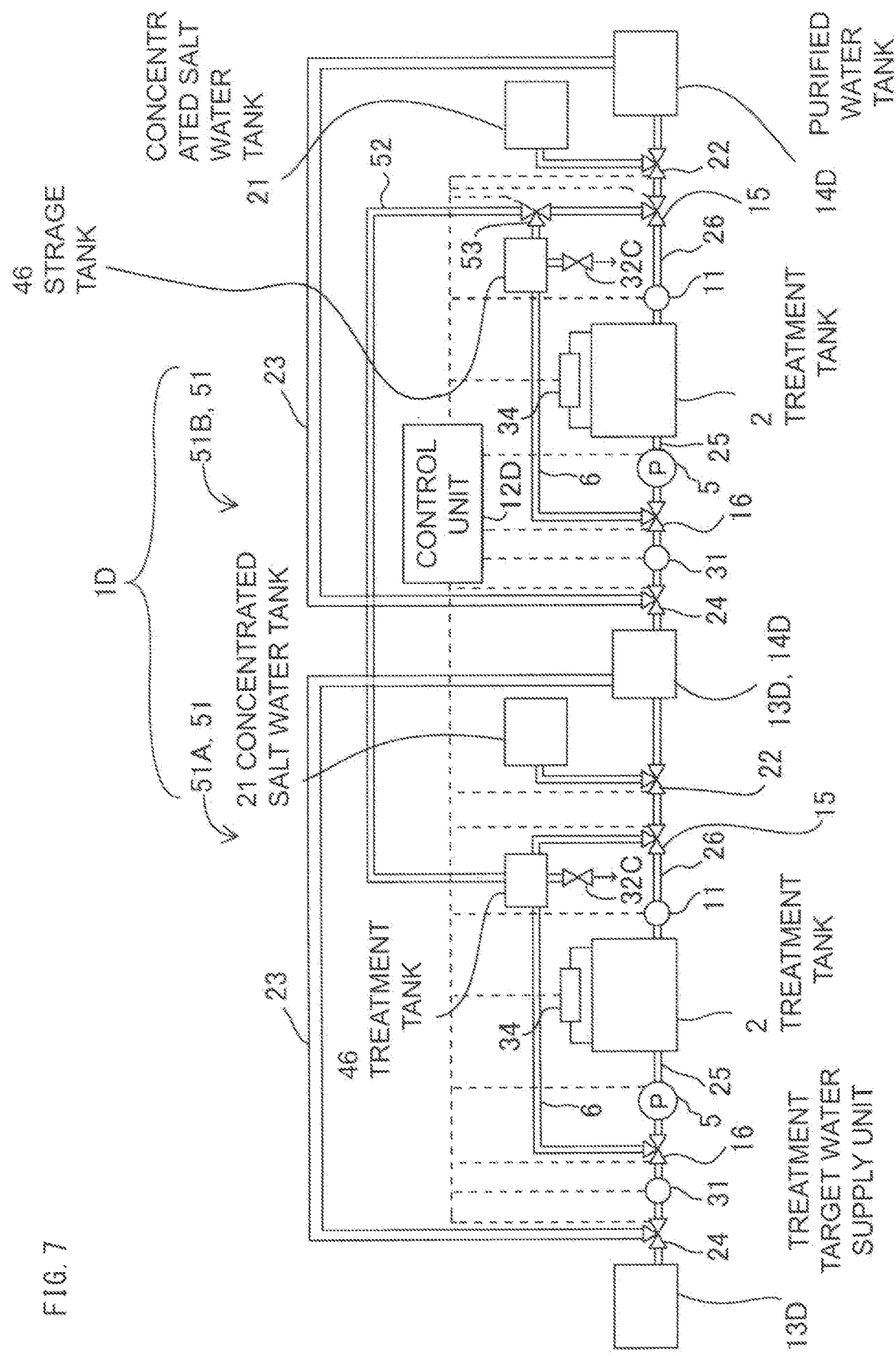
FIG. 7 shows a configuration of a water treatment device according to embodiment 4 of the present invention.

Next, a water treatment device 1D according to embodiment 4 of the present invention will be described below with reference to the drawings. Embodiment 4 is similar to embodiment 3 described above, and in the following, differences of embodiment 3 from embodiment 1 are mainly described. FIG. 7 shows a configuration of the water treatment device 1D according to embodiment 4 of the present invention.

As shown in FIG. 7, the water treatment device 1D according to embodiment 4 is configured such that a plurality of the treatment tanks 2 are connected in series from the upstream side to the downstream side. When each configuration including the treatment tank 2 and others is referred to as a "water treatment unit 51", each water treatment unit 51 has a configuration similar to that of the water treatment device 1C shown in embodiment 3. FIG. 7 shows a state in which two water treatment units 51 are connected. A purified water tank 14D of a water treatment unit 51A on the upstream side also serves as a treatment target water supply unit 13D of a water treatment unit 51B on the downstream side. Accordingly, in the purification treatment step ST21, water having been supplied as the treatment target water on the upstream side is subjected to two purification treatments and then stored into the purified water tank 14D of the water treatment unit 51B on the downstream side.

For the plurality of the water treatment units 51, a single control unit 12D is provided, and the control unit 12D performs control with respect to both the water treatment unit 51A on the upstream side and the water treatment unit 51B on the downstream side. The DC power supplies 34 at the plurality of the treatment tanks 2 may be integrated into one. However, FIG. 7 shows a case where one DC power supply 34 is provided in each water treatment unit 51.

The water treatment device 1D according to the present embodiment further includes a direct transfer pipeline 52. The direct transfer pipeline connects the flow path from a position in the circulation pipeline 6 of the water treatment unit 51B on the downstream side, to the storage tank 46 provided to the circulation pipeline 6 of the water treatment unit 51A on the upstream side. A direct transfer switching valve 53 is provided at the connection portion of the circulation pipeline 6 and the direct transfer pipeline 52 in the water treatment unit 51B on the downstream side. The direct transfer switching valve 53 switches between: circulating the water through the circulation pipeline 6 of the water treatment unit 51B on the downstream side; and sending, to the storage tank 46 on the upstream side via the direct transfer pipeline 52, the water having flowed into the circulation pipeline 6 from the pipeline 26 on the downstream side of the treatment tank 2 on the downstream side.

Accordingly, when the downstream-side switching valve 15 and the direct transfer switching valve 53 of the water treatment unit 51B are controlled during the purification treatment, the treated water in the treatment tank 2 of the water treatment unit 51B can be transferred to the storage tank 46 of the water treatment unit 51A. Thus, the treated water in the treatment tank 2 of the water treatment unit 51B can be used as the washing water in the circulation washing mode of the water treatment unit 51A. When the purified water tank 14D of the water treatment unit 51B and the storage tank 46 of the water treatment unit 51A are connected to each other, and the purified water tank 14D of the water treatment unit 51B and the storage tank 46 of the water treatment unit 51B are connected to each other, and further a transfer means such as a pump is provided at a position in these pipes, the treated water having been subjected to two purification treatments can be used as a part or all of the washing water in the washing step ST2 of the water treatment units 51A, 51B, as described in embodiment 3.

According to embodiment 4, a plurality of the water treatment units 51 are connected in series from the upstream side to the downstream side, whereby treated water having a lower electric conductivity can be obtained. Thus, this configuration is suitable for a case where so-called pure water, ultrapure water, or the like is generated.

According to embodiment 4, the water treatment device 1D includes the direct transfer pipeline 52 and the direct transfer switching valve 53. Therefore, the treated water having been subjected to two purification treatments can be transferred to the storage tank 46 of the water treatment unit 51A on the upstream side, and the treated water having been subjected to two purification treatments can be used in the circulation washing mode in the water treatment unit 51A.

Embodiment 5

Figure 8:
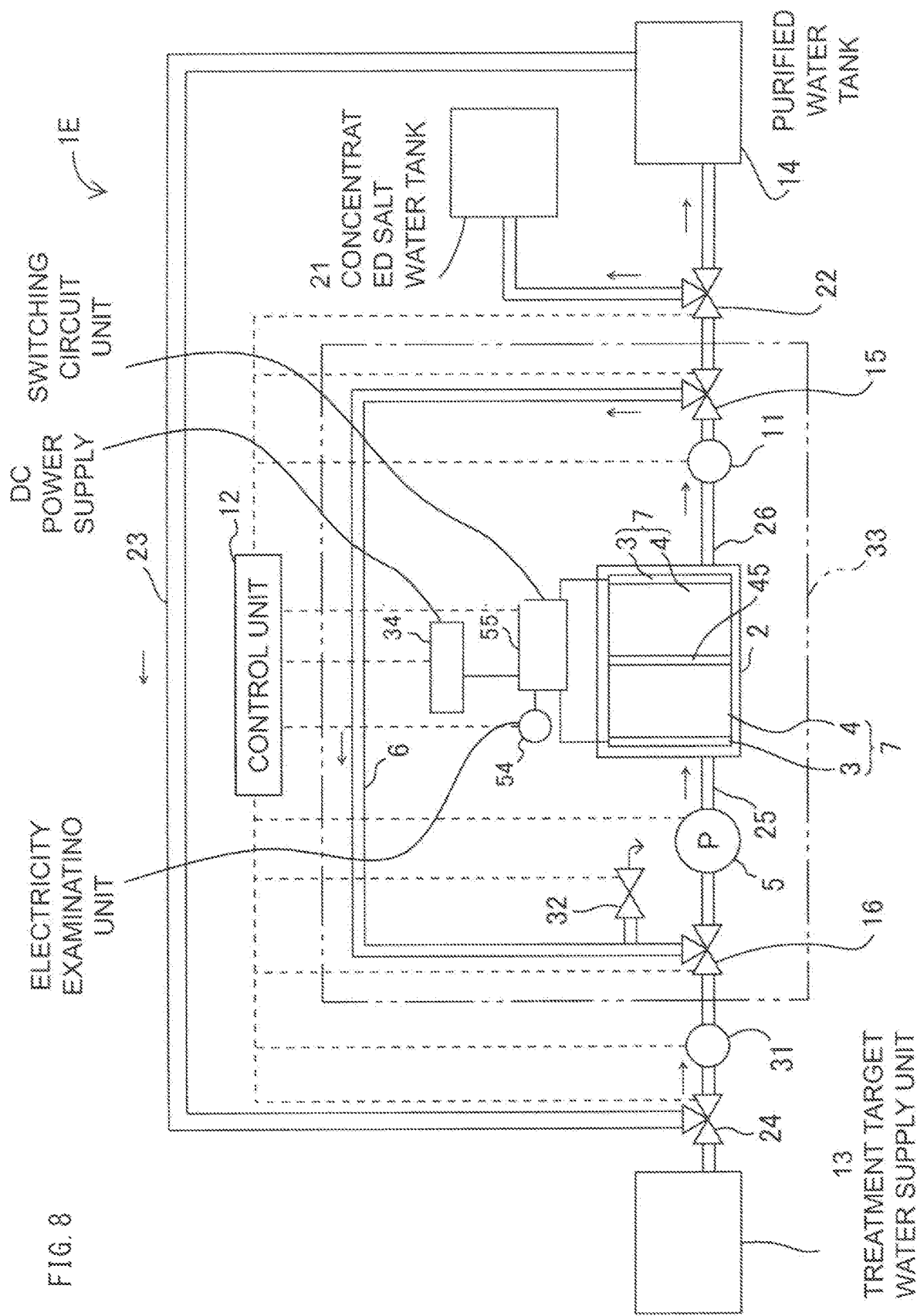
FIG. 8 shows a configuration of a water treatment device according to embodiment 5 of the present invention.

Next, a water treatment device 1E according to embodiment 5 of the present invention will be described below with reference to the drawings. Embodiment 5 is similar to embodiment 1 described above, and in the following, differences of embodiment 5 from embodiment 1 are mainly described. FIG. 8 shows a configuration of the water treatment device 1E according to embodiment 5 of the present invention.

The water treatment device 1E includes a switching circuit unit 55. In embodiment 1, the direction of electricity that is applied to the electrode units 7, and the states of stop of the application of the electricity and short-circuiting, can be switched by the control unit 12. However, in embodiment 5, the direction of electricity that is applied to the electrode units 7, and the states of stop of the application of the electricity and short-circuiting, are switched by the switching circuit unit 55 in accordance with a determination by the control unit 12. The switching circuit unit 55 is provided at a position in the connection path from the DC power supply 34 to the electrode units 7, and is connected to the control unit 12.

The water treatment device 1E includes an electricity examination unit 54 as an electric state examination unit. The electricity examination unit 54 examines the electric state of the treatment tank 2. Specifically, the electricity examination unit 54 measures at least one of the voltage, the current, or the amount of electric charge between the electrode units 7. The amount of electric charge is obtained by integrating the current over time. The calculation of the amount of electric charge may be performed by the control unit 12. The electricity examination unit 54 is connected to the control unit 12 serving as an electric state base control unit. On the basis of a measurement result by the electricity examination unit 54, the control unit 12 determines whether to: perform application of electricity to the electrode units 7; or perform at least one of stop of the application of the electricity, short-circuiting, or application of electricity in a reverse direction. Then, the control unit 12 switches the switching circuit unit 55. In the present embodiment, the control unit 12 also serves as a water quality base control unit.

Figure 9:
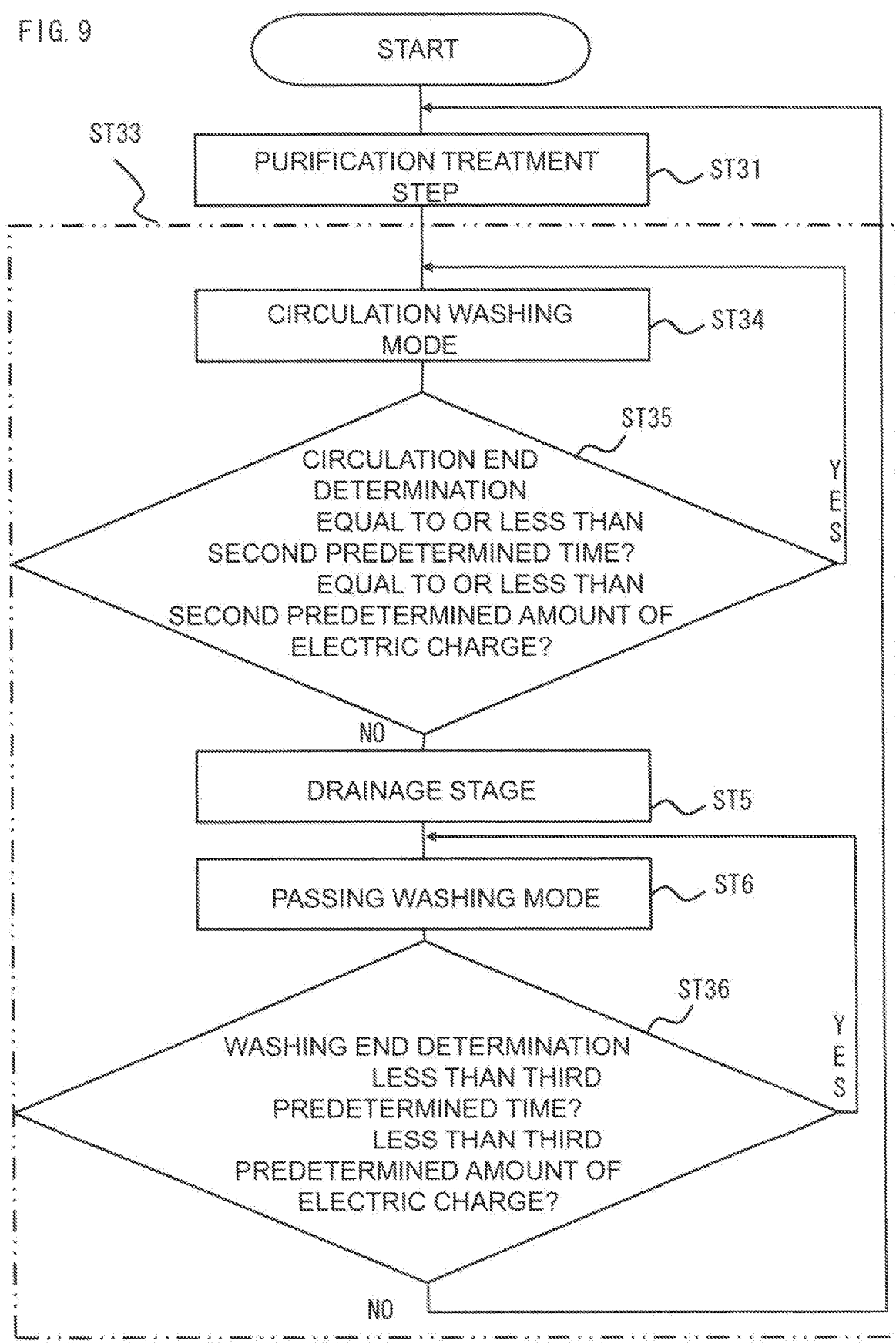
FIG. 9 is a flow chart showing the steps of a water treatment method according to embodiment 5 of the present invention.

Next, a water treatment method is described. FIG. 9 is a flow chart showing the steps of the water treatment method. In a purification treatment step ST31 in the present embodiment, in addition to the treatment similar to that in embodiment 1, the electricity examination unit 54 obtains an amount of electric charge from the current flowing between the electrode units 7. The purification treatment step ST31 is ended when a predetermined time has elapsed. In the description below, in order to distinguish a predetermined time as the determination criterion in each step of the water treatment method, the predetermined time serving as the determination criterion for ending the purification treatment step ST31 will be referred to as a "first predetermined time".

The amount of electric charge that has flowed between the electrode units 7 from the start to the end of the purification treatment step ST31 is stored as data. In the following, this amount of electric charge will be referred to as an "overall amount of electric charge".

After the purification treatment step ST31, the procedure is shifted to a circulation washing mode ST34, and the porous electrodes 4 are subjected to washing treatment while water is circulated via the circulation pipeline 6. In the circulation washing mode ST34, the electrode units 7 are short-circuited or reversely connected in accordance with the overall amount of electric charge in the purification treatment step ST31. The reverse connection means that electricity is applied to the electrode units 7 in a direction reverse to the electricity application direction in the purification treatment step ST31. A predetermined value, for the amount of electric charge, which serves as the determination criterion at this time will be referred to as a "first predetermined amount of electric charge". It is determined that the electrode units 7 are short-circuited in the circulation washing mode ST34 when the overall amount of electric charge is equal to or less than the first predetermined amount of electric charge, and it is determined that the electrode units 7 are reversely connected in the circulation washing mode ST34 when the overall amount of electric charge exceeds the first predetermined amount of electric charge. The selection and determination are performed by the control unit 12, and the short-circuiting and reverse connection are performed by the switching circuit unit 55 in accordance with the control unit 12.

In the circulation washing mode ST34, determining whether to short-circuit or reversely connect the electrode units 7 in accordance with the magnitude of the overall amount of electric charge has the following technological reason. When the overall amount of electric charge is smaller than the first predetermined amount of electric charge, the amount of the ionic substance electrically adsorbed by the porous electrodes 4 in the purification treatment step ST31 is predicted to be small. Thus, performing reverse connection does not have importance in washing of the porous electrodes 4, and it can be determined that the ionic substance adsorbed by the porous electrodes 4 can desorbed only by short-circuiting the electrode units 7. However, when the overall amount of electric charge is greater than the first predetermined amount of electric charge, it is possible to determine that a lot of ionic substances have been electrically adsorbed by the porous electrodes 4 in the purification treatment step ST31. Thus, performing reverse connection is determined to have importance in washing of the porous electrodes 4. The first predetermined amount of electric charge as the criterion for determining the magnitude of the overall amount of electric charge is determined on the basis of such technological reason.

When the reverse connection is performed in the circulation washing mode ST34, electricity in the direction reverse to that in the purification treatment step ST31 flows between the electrode units 7. At this time, the electricity examination unit 54 detects the direction of the electricity flowing between the electrode units 7, and measures at least one of: the voltage across the electrode units 7; the current flowing between the electrode units 7; or the amount of electric charge flowing between the electrode units 7. As for the amount of electric charge, the amount of electric charge flowing between the electrode units 7 is obtained by integrating the current measured by an ammeter over time.

Next, the procedure is shifted to a circulation end determination ST35. As to whether or not to end the circulation washing mode ST34, predetermined values are determined in advance for the duration time and the amount of electric charge. A predetermined value for the duration time set as a determination criterion for the circulation end determination ST35 will be referred to as a "second predetermined time". A predetermined value for the amount of electric charge set as a determination criterion for the circulation end determination ST35 will be referred to as a "second predetermined amount of electric charge".

In the circulation end determination ST35, when a lapse of the second predetermined time in the circulation washing mode ST34 is used as the determination criterion, the circulation washing mode ST34 is ended when the duration time of the circulation washing mode ST34 has exceeded the second predetermined time. In a case where the second predetermined amount of electric charge is used as the determination criterion, when the electrode units 7 are short-circuited, the current that flows between the electrode units 7 at the time of the short-circuit is measured by the electricity examination unit 54, and when an amount of electric charge obtained by integrating the current over time has exceeded the second predetermined amount of electric charge, the circulation washing mode ST34 is ended. When the electrode units 7 are reversely connected, the current that flows between the electrode units 7 at the time of reverse connection is measured by the electricity examination unit 54, and when an amount of electric charge obtained by integrating the current over time has exceeded the second predetermined amount of electric charge, the circulation washing mode ST34 is ended. When both of the short-circuiting and the reverse connection between the electrode units 7 are performed in the circulation washing mode ST34, the current that flows between the electrode units 7 is measured by the electricity examination unit 54, and when an amount of electric charge obtained by integrating the current over time has exceeded the second predetermined amount of electric charge, the circulation washing mode ST34 is ended. The second predetermined amount of electric charge is a value equal to or less than the overall amount of electric charge. When the circulation washing mode ST34 is ended, the procedure is shifted to the next drainage stage ST5.

The drainage stage ST5 is the same as that in embodiment 1. Next, the procedure is advanced to the passing washing mode ST6. In the passing washing mode ST6, the electrode units 7 are short-circuited. However, the present invention is not limited to short-circuiting. Instead, reverse connection may be performed. Alternatively, both reverse connection and short-circuiting may be performed. In the passing washing mode ST6, a washing end determination ST36 is simultaneously performed in parallel. In the washing end determination ST36, whether or not to end the passing washing mode ST6 is determined on the basis of the duration time of the passing washing mode ST6 or the amount of electric charge that has flowed between the electrode units 7. The determination criteria at this time will be referred to as a "third predetermined time" and a "third predetermined amount of electric charge". In a case where the determination regarding the washing end determination ST36 is performed on the basis of the third predetermined time, when the duration time of the passing washing mode ST6 is less than the third predetermined time, the passing washing mode ST6 is continued. When the duration time of the passing washing mode ST6 is equal to or greater than the third predetermined time, the passing washing mode ST6 is ended. In a case where determination regarding the washing end determination ST36 is performed on the basis of the third predetermined amount of electric charge, the current flowing between the electrode units 7 is measured by the electricity examination unit 54, and the amount of electric charge is calculated by integrating the current over time. When the amount of electric charge is less than the third predetermined amount of electric charge, the passing washing mode ST6 is continued, and when the amount of electric charge is equal to or greater than the third predetermined amount of electric charge, the passing washing mode ST6 is ended.

The determination in the washing end determination ST36 is performed by the control unit 12. When the passing washing mode ST6 is ended on the basis of the determination in the washing end determination ST36, a washing step ST33 is ended accordingly, and the procedure is shifted to the purification treatment step ST31. The direction of electricity between the electrode units 7 when the procedure is shifted from the washing step ST33 to the purification treatment step ST31 is set by the switching circuit unit 55 on the basis of determination by the control unit 12.

It is assumed that, of the time during which the washing step ST33 is performed, in the time other than the time during which reverse connection is performed, application of electricity from the DC power supply 34 is canceled and the electrode units 7 are short-circuited.

The electricity examination unit 54 uses, as the determination criterion, the amount of electric charge obtained by integrating current over time. However, the present invention is not limited thereto. At least one of current or voltage is measured, and the result thereof may be used as the determination criterion for the control. Also in this case, the electricity examination unit 54 can be realized by use of a voltmeter, an ammeter, or the like.

The purification treatment step ST31 is ended when the duration time thereof has exceeded the first predetermined time. However, it may be determined that the purification treatment step ST31 is ended when the amount of electric charge that has flowed between the electrode units 7 in the purification treatment step ST31 has exceeded a predetermined amount of electric charge. In this case, the predetermined amount of electric charge for determining the ending is set as an amount of electric charge equal to or less than an amount of electric charge that corresponds to the maximum absorbable capacity of the electrode units 7.

The ending of the purification treatment step ST31 may be determined on the basis of an examination result by the examination unit 11 which examines the water quality. In this case, the ending of the purification treatment step ST31 can be determined when the purification performance in the treatment tank 2 is becoming low. Thus, the efficiency of the water treatment device 1E can be improved.

The ending of the process of guiding the initial flow to the concentrated salt water tank 21 may be determined by the control unit 12 when the amount of electric charge having flowed between the electrode units 7 since the start of the purification treatment step ST31 has exceeded a predetermined amount of electric charge.

The determination criterion in the circulation end determination ST35 is not necessarily limited to a predetermined value of the amount of electric charge even when reverse connection is performed in the circulation washing mode ST34. For example, similar to embodiment 1, in the first circulation end determination ST35 after the start of operation of the water treatment device 1E, the ending of the circulation washing mode ST34 is determined using the change amount per unit time of electric conductivity of washing water as a criterion, and in the second circulation end determination ST35 and thereafter, the ending of the circulation washing mode ST34 may be determined on the basis of the amount of electric charge having flowed between the electrode units 7 in the first circulation washing mode ST34.

Alternatively, a test operation is performed, and in the test operation, the ending of the circulation washing mode ST34 is determined using the change amount per unit time of electric conductivity of washing water as a criterion, and data in the test operation is stored. Then, the ending of the circulation washing mode ST34 may be determined in the circulation end determination ST35 in a real operation, on the basis of the amount of electric charge having flowed between the electrode units 7 in the circulation washing mode ST34 in the test operation.

For determination of the supply amount of electric charge at the time of reverse connection, other than the amount of electric charge having been supplied to the electrode units 7 in the purification treatment step ST31 and measured by the electricity examination unit 54, an adsorption efficiency that indicates the proportion of the total amount of actually-adsorbed electric charge of the ionic substance, relative to the amount of electric charge supplied in the purification treatment step ST31, may be used. The adsorption efficiency does not exceed 100% when the ionic substance is electrically adsorbed by the electrode units 7.

As in a case of a bipolar power supply, when the DC power supply 34 can realize reverse connection and short-circuiting without the switching circuit unit 55, the switching circuit unit 55 may be omitted from the configuration of the water treatment device 1E. When the DC power supply 34 can realize reverse connection without the switching circuit unit 55 but cannot realize short-circuiting, the short-circuiting may be realized by the switching circuit unit 55. The washing step ST33 may be set such that reverse connection is performed at an arbitrary timing and an arbitrary number of times. Short-circuiting may be performed while reverse connection is not performed during the time in which the washing step ST33 is performed.

In the present embodiment, executions of reverse connection and short-circuiting are controlled by the control unit 12 on the basis of an examination result of the electricity examination unit 54. However, a certain amount of electric charge may be supplied at the time of reverse connection, without the electricity examination unit 54 being provided. The maximum value of the amount of electric charge at this time may take any value, as long as the value is equal to or less than the amount of electric charge having been supplied to the electrode units 7 in the purification treatment step ST31, or the amount of electric charge necessary for adsorption by the adsorption capacity of the ionic substance of the electrode units 7.

The examination result by the examination unit 11 in the washing step ST33 may be used as a determination criterion when the control unit 12 determines whether to perform reverse connection in the next washing step ST33 and thereafter, whether to increase or decrease the voltage, the current, and the amount of electric charge in the reverse connection, and the like.

Although the disclosure is described above in terms of an exemplary embodiment, it should be understood that the various features, aspects and functionality described in the embodiment are not limited in their applicability to the particular embodiment with which they are described, but instead can be applied alone or in various combinations to the embodiments of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS

1, 1B, 1C, 1D water treatment device
2 treatment tank
3 collector electrode
4 porous electrode
5 pump
6 circulation pipeline
7 electrode unit
11 examination unit
12, 12C, 12D control unit
13, 13D treatment target water supply unit
14, 14D purified water tank
15 downstream-side switching valve
16 upstream-side switching valve
21 concentrated salt water tank
22 flow path switching valve
23 return pipeline
24 return switching valve
25 pipeline on upstream side
26 pipeline on downstream side
31 upstream-side examination unit
32, 32C drain valve
33, 33B, 33C circulation unit
34 DC power supply
41 positive electrode
42 negative electrode
43 negative-electrode-side porous electrode
44 positive-electrode-side porous electrode
45 separator
46 storage tank
51, 51A, 51B water treatment unit
52 direct transfer pipeline
53 direct transfer switching valve
54 electricity examination unit
55 switching circuit unit

The invention claimed is:

1. A water treatment device for removing an impurity in water, the water treatment device comprising:
   electrodes for performing adsorption/desorption of the impurity;
   a treatment tank having the electrodes disposed in an inside of the treatment tank;
   an upstream pipeline connected to the treatment tank and for guiding the water into the inside;
   a downstream pipeline connected to the treatment tank and for guiding the water in the inside so as to be discharged, the water having been subjected to the adsorption/desorption performed by the electrodes;
   a circulation pipeline connected to the upstream pipeline and the downstream pipeline, the circulation pipeline being for guiding water having been guided by the downstream pipeline, to the upstream pipeline;
   an electric state examination circuit including circuitry for examining at least one of voltage of the electrodes, current of the electrodes, or the cumulative amount of electric charge passed across the electrodes of the treatment tank;

a switching valve for switching between, on the basis of at least one of a water quality of the water having been guided to the downstream pipeline, voltage of the electrodes, current of the electrodes, or a cumulative amount of electric charge passed across the electrodes of the treatment tank, guiding the water having been guided by the downstream pipeline, so as to be discharged, and guiding the water to the circulation pipeline; and an electric state base control circuit for controlling switching of the switching valve on the basis of an examination result by the electric state examination circuit, wherein the impurity is an ionic substance.

2. The water treatment device according to claim 1, comprising:

a water quality examination circuit for examining the water quality; and a water quality base control circuit for controlling switching of the switching valve on the basis of an examination result by the water quality examination circuit.

3. The water treatment device according to claim 2, comprising a discharge valve for discharging the water having been guided by the downstream pipeline so as to be discharged, wherein the water quality examination circuit is disposed at the downstream pipeline.

4. The water treatment device according to claim 2, wherein on the basis of an examination result by the water quality examination circuit, the water quality base control circuit determines whether to: perform application of voltage or current to the electrodes; or perform at least one of stop of the application of the voltage or current, short-circuiting of the electrodes, or application of voltage or current in a reverse direction.

5. The water treatment device according to claim 1, wherein on the basis of an examination result by the electric state examination circuit, the electric state base control circuit determines whether to: perform application of voltage or current to the electrodes; or perform at least one of stop of the application of the voltage or current, short-circuiting of the electrodes, or application of voltage or current in a reverse direction.

6. The water treatment device according to claim 1, comprising a switching circuit for switching among application of voltage or current to the electrodes, stop of the application of the voltage or current, short-circuiting of the electrodes, and application of voltage or current in a reverse direction.

7. The water treatment device according to claim 1, wherein the electric state examination circuit of the treatment tank examines a direction of application of voltage or current of the electrodes, and one or more of current of the electrodes, voltage of the electrodes, and the cumulative amount of electric charge passed across the electrodes, and on the basis of an examination result by the electric state examination circuit, the electric state base control circuit determines whether to: perform application of voltage or current to the electrodes; or perform at least one of stop of the application of the electricity, short-circuiting of the electrodes, or application of voltage or current in a reverse direction.

8. The water treatment device according to claim 2, wherein the water quality examination circuit disposed at the downstream pipeline examines a water quality of the water at a position in a portion, in the downstream pipeline, from the treatment tank to a connection position of the downstream pipeline and the circulation pipeline.

9. The water treatment device according to claim 3, comprising an upstream-side examination circuit for examining a water quality of the water at a position in the upstream pipeline, wherein on the basis of an examination result by the upstream-side examination circuit and an examination result by the water quality examination circuit, the water quality base control circuit determines whether to: perform application of voltage or current to the electrodes; or perform at least one of stop of the application of the voltage or current, short-circuiting of the electrodes, or application of voltage or current in a reverse direction, and on the basis of an examination result by the upstream-side examination circuit and an examination result by the water quality examination circuit, the water quality base control circuit determines switching between: guiding the water having been guided to the downstream pipeline so as to be discharged; and guiding the water to the circulation pipeline.

10. The water treatment device according to claim 2, wherein the water quality examination circuit includes circuitry configured to measure one or more of an electric conductivity, electric resistance, ion concentration, and hardness of the water.

11. The water treatment device according to claim 2, wherein the water quality base control circuit includes a programmable logic controller (PLC), a sequencer circuit, or a numerical control device.

12. The water treatment device according to claim 1, wherein the electric state base control circuit includes a programmable logic controller (PLC), a sequencer circuit, or a numerical control device.

13. The water treatment device according to claim 9, wherein the upstream-side examination circuit includes circuitry configured to measure one or more of an electric conductivity, electric resistance, ion concentration, and hardness of the water in the upstream pipeline.

14. A water treatment device for removing an impurity in water, the water treatment device comprising:

electrodes for performing adsorption and desorption of the impurity;

a treatment tank having the electrodes disposed in an inside of the treatment tank;

an upstream pipeline connected to the treatment tank and for guiding the water into the inside;

a downstream pipeline connected to the treatment tank and for guiding the water in the inside so as to be discharged, the water having been subjected to the adsorption and desorption performed by the electrodes;

a circulation pipeline connected to the upstream pipeline and the downstream pipeline, the circulation pipeline being for guiding water having been guided by the downstream pipeline, to the upstream pipeline; and a switching valve for switching between, on the basis of at least one of a water quality of the water having been guided to the downstream pipeline, voltage of the electrodes, current of the electrodes, or an amount of electric charge of the electrodes or an electric state of the treatment tank, guiding the water having been guided by the downstream pipeline, so as to be discharged, and guiding the water to the circulation pipeline; and at least one of
- a water quality examination circuit for examining the water quality and a water quality base control circuit for controlling switching of the switching valve on the basis of an examination result by the water quality examination circuit, and
- an electric state examination circuit for examining at least one of a voltage of the electrodes, a current of the electrodes, or the amount of electric charge of the electrodes or the electric state of the treatment tank, and an electric state base control circuit for controlling switching of the switching valve on the basis of an examination result by the electric state examination circuit, wherein, the impurity is an ionic substance, and the water quality base control circuit or the electric state base control circuit is configured to switch between a circulation washing mode in which the electrodes are subjected to a washing treatment while the water is guided via the circulation pipeline from the downstream pipeline to the upstream pipeline and a passing washing mode in which the electrodes are subjected to a washing treatment while the water in the upstream pipeline is guided, not via the circulation pipeline, to the downstream pipeline so as to be guided to be discharged on the basis of an examination result by the water quality examination circuit or an examination result by the electric state examination circuit.

* * * * *